(12) United States Patent
Park et al.

(10) Patent No.: US 10,976,847 B2
(45) Date of Patent: Apr. 13, 2021

(54) TOUCH SENSOR AND DISPLAY DEVICE HAVING THE SAME

(71) Applicant: Samsung Display Co., Ltd., Yongin-si (KR)

(72) Inventors: Jun Hyun Park, Yongin-si (KR); Ki Cheol Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/372,411

(22) Filed: Apr. 2, 2019

(65) Prior Publication Data

US 2019/0369787 A1 Dec. 5, 2019

(30) Foreign Application Priority Data

May 30, 2018 (KR) .......................... 10-2018-0062093

(51) Int. Cl.
*G06F 3/041* (2006.01)
*G06F 3/044* (2006.01)
*G06F 3/047* (2006.01)

(52) U.S. Cl.
CPC ............ *G06F 3/0412* (2013.01); *G06F 3/044* (2013.01); *G06F 3/047* (2013.01); *G06F 2203/04104* (2013.01); *G06F 2203/04107* (2013.01)

(58) Field of Classification Search
None
See application file for complete search history.

(56) References Cited

U.S. PATENT DOCUMENTS

| 7,830,591 | B2 | 11/2010 | Shimodaira |
| 10,460,147 | B2 | 10/2019 | Yang et al. |
| 2009/0085891 | A1* | 4/2009 | Yang ..................... G01R 31/28 345/174 |
| 2010/0110038 | A1* | 5/2010 | Mo ........................ G06F 3/044 345/174 |
| 2013/0106747 | A1 | 5/2013 | Choi et al. |

(Continued)

FOREIGN PATENT DOCUMENTS

| CN | 105631421 | 6/2016 |
| CN | 107102693 | 8/2017 |

(Continued)

*Primary Examiner* — Christopher R Lamb
(74) *Attorney, Agent, or Firm* — H.C. Park & Associates, PLC

(57) ABSTRACT

A touch sensor includes: a plurality of first sensor electrodes, each including first sensor patterns extending in a first direction, and being arranged in a second direction; a plurality of second sensor electrodes, each including second sensor patterns extending in the second direction and being arranged in the first direction; an opening in a touch active region separated from the first and second sensor electrodes; a first connection pattern disposed around but not in the opening, the first pattern electrically connecting first opening sensor patterns of the first sensor patterns that are adjacent to respective portions of the opening in the second direction; first lines respectively connected to portions of the first sensor electrodes, the first lines extending to a periphery of the touch active region; and second lines respectively connected to portions of the second sensor electrodes, the second lines extending to the periphery of the touch active region.

18 Claims, 19 Drawing Sheets

(56) References Cited

U.S. PATENT DOCUMENTS

| | | |
|---|---|---|
| 2014/0184950 A1 | 7/2014 | Chu et al. |
| 2014/0197428 A1* | 7/2014 | Wang .................. G07F 17/32 257/88 |
| 2015/0077383 A1 | 3/2015 | Kang et al. |
| 2016/0111040 A1 | 4/2016 | Kim et al. |
| 2016/0365693 A1* | 12/2016 | Chuang ............. G01N 21/8806 |
| 2017/0249906 A1* | 8/2017 | Noh .................... G09G 3/3266 |
| 2017/0287992 A1 | 10/2017 | Kwak et al. |
| 2017/0344141 A1 | 11/2017 | Lee |
| 2018/0089485 A1 | 3/2018 | Bok |
| 2018/0129330 A1 | 5/2018 | Ding et al. |

FOREIGN PATENT DOCUMENTS

| | | |
|---|---|---|
| EP | 2750008 | 7/2014 |
| KR | 10-1493556 | 12/2015 |
| KR | 10-2017-0111827 | 10/2017 |
| KR | 10-2017-0133567 | 12/2017 |

* cited by examiner

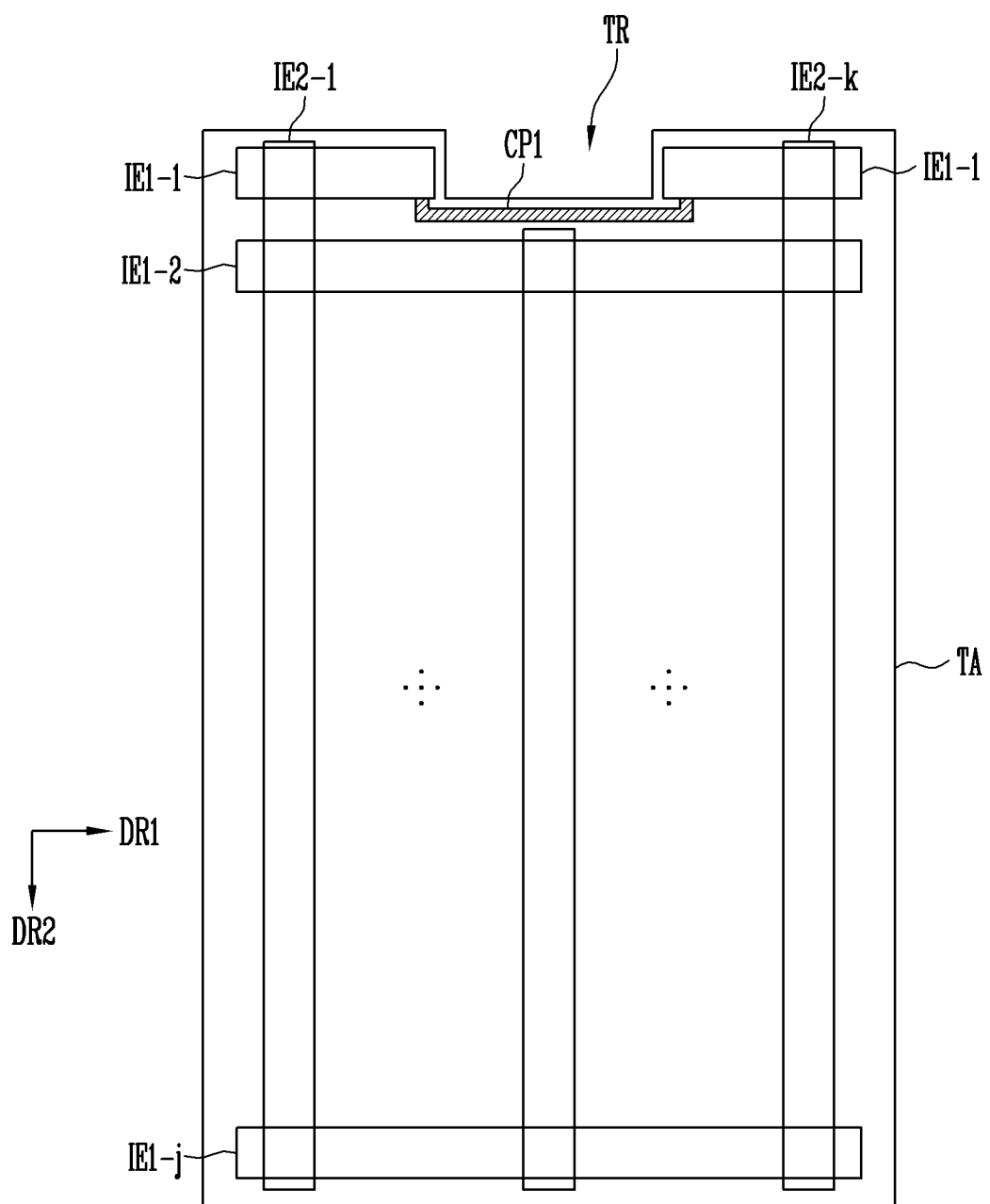

TOUCH SENSOR AND DISPLAY DEVICE HAVING THE SAME

CROSS-REFERENCE TO RELATED APPLICATION

This application claims priority from and the benefit of Korean Patent Application No. 10-2018-0062093, filed on May 30, 2018, which is hereby incorporated by reference for all purposes as if fully set forth herein.

BACKGROUND

Field

Exemplary implementations of the invention relate generally to a display device and, more specifically, to a touch sensor and a display device having the same.

Discussion of the Background

A touch sensor is an information input device, and may be provided and used in a display device. For example, the touch sensor may be attached to one surface of a display panel or be integrally formed with the display panel. A user may input information by pressing or touching the touch sensor while viewing an image displayed on a screen of a touch display device.

With the development of recent display technology, an opening through which a functional electronic element may be inserted is formed in a display region and a touch region of a display device.

The above information disclosed in this Background section is only for understanding of the background of the inventive concepts, and, therefore, it may contain information that does not constitute prior art.

SUMMARY

Devices constructed according to exemplary implementations of the invention are optimized to accommodate for openings in touch sensors for electronic components and are capable of improving touch sensing sensitivity and sensing uniformity of a touch active region of a touch sensor and display including the same in which the touch sensor includes such an opening.

For example, touch sensors and display devices constructed according to some exemplary embodiments of the invention may include routing lines disposed at both ends of the sensor electrodes separated by the opening, so that an increase in the number of lines in the peripheral region can be minimized or reduced, and sensing sensitivity and sensing uniformity in the touch active region can be improved. In addition, a shielding electrode may be additionally inserted between the routing lines to minimize electrical influence between lines in the peripheral region. Thus, touch sensing accuracy can be improved.

Further, touch sensors and display devices constructed according to some exemplary embodiments of the invention may include a connection pattern connecting between the opening in the sensor patterns. Thus, touch sensing can be performed on the entire region in which the sensor electrodes are disposed without adding any routing line, and adequate design space for the peripheral region can be sufficiently ensured.

Additional features of the inventive concepts will be set forth in the description which follows, and in part will be apparent from the description, or may be learned by practice of the inventive concepts.

According to one or more embodiments of the invention, a touch sensor having a touch active region and a peripheral region surrounding at least a portion of the touch active region includes: first sensor electrodes extending in a first direction and arranged in a second direction intersecting the first direction; second sensor electrodes extending in the second direction and arranged in the first direction; an opening in the touch active region spaced from the first sensor electrodes and the second sensor electrodes; a third sensor electrode extending in the first direction and disposed at a first portion of the opening; a fourth sensor electrode extending in the second direction and disposed at a second portion of the opening; first lines respectively connected to portions of the first sensor electrodes, the first lines disposed in a first peripheral area of the peripheral region adjacent to the first portion of the opening; second lines respectively connected to portions of the second sensor electrodes, the second lines disposed in a second peripheral area of the peripheral region adjacent to the second portion of the opening; a third line connected to a portion of the third sensor electrode, the third line disposed in the first peripheral area; a fourth line connected to a portion of the fourth sensor electrode, the fourth line disposed in the second peripheral area; and a first shielding electrode disposed in the second peripheral region, the first shielding electrode extending between the second lines and the fourth line.

The portions of the first and second sensor electrodes to which the first and second lines may be respectively connected include distal ends of the first and second sensor electrodes, respectively.

The at least one of the first lines, the second lines, the third lines and the fourth line may include routing lines.

The first and second portions of the opening may include generally opposed first and second sides.

The third sensor electrode and the fourth sensor electrode may be electrically insulated from each other.

The third sensor electrode and the fourth sensor electrode may be spaced apart from a wall of the opening.

The first lines and the third line may extend adjacent to each other.

The touch sensor may further include: a second shielding electrode disposed in the peripheral region extending between the first lines and the touch active region; and a third shielding electrode disposed in the peripheral region outside of the first lines and the third lines.

The touch sensor may further include: a fourth shielding electrode extending between the fourth line and the touch active region; and a fifth shielding electrode disposed outside of the second lines.

The touch sensor may further include: additional lines respectively connected to other portions of the second sensor electrodes, the additional lines transferring substantially the same driving signal as the second lines.

The touch sensor may further including: additional shielding electrodes respectively disposed between the additional lines and the first lines and between the additional lines and the fourth line.

The at least one sensor electrode of the second sensor electrodes may be electrically separated into a third part and a fourth parts by the opening, wherein the third part may be disposed at a third portion of the opening, and wherein the fourth part may be disposed at a fourth portion of the opening, the fourth portion being generally opposite to the third portion.

The third part may be not connected to the second line.

The third part and the fourth part may be electrically connected through at least one connector disposed around but not into the opening.

The connector and the second sensor electrodes may be formed in different layers with an insulating layer interposed therebetween, wherein the connector may be connected to the third and fourth parts via a contact hole formed through the insulating layer, and wherein the connector may include a low-resistance metal.

The touch sensor may further include: an electrostatic protection line disposed in the peripheral region in an open loop shape surrounding the first, second, third and fourth line along circumference periphery of the touch active region.

The third sensor electrode and the fourth sensor electrode may be electrically connected to each other through at least one connector disposed around but not into the opening.

The connector may include a connection pattern spaced apart from the opening.

The connector may include a connection pattern formed in a layer different from that of the third and fourth sensor electrodes with an insulating layer interposed therebetween, wherein the connection pattern may be connected to the third and fourth sensor electrodes via a contact hole in the insulating layer, and wherein the connection pattern may include a low-resistance metal.

According to one or more embodiments of the invention, a touch sensor includes: a plurality of first sensor electrodes, each including first sensor patterns extending in a first direction, the plurality of first sensor electrodes being arranged in a second direction intersecting the first direction; a plurality of second sensor electrodes, each including second sensor patterns extending in the second direction, the plurality of second sensor electrodes being arranged in the first direction; an opening in a touch active region separated from the first sensor electrodes and the second sensor electrodes; a first connection pattern disposed around but not in the opening, the first connection pattern electrically connecting first opening sensor patterns of the first sensor patterns that are adjacent to respective portions of the opening in the second direction; first routing lines respectively connected to portions of the first sensor electrodes, the first routing lines extending to a periphery of the touch active region; and second routing lines respectively connected to portions of the second sensor electrodes, the second routing lines extending to the periphery of the touch active region.

The portions of the first and second sensor electrodes to which the first and second routing lines are respectively connected may include distal ends of the first and second sensor electrodes, respectively.

The each of the first connection pattern and the first opening sensor patterns may be disposed spaced apart from walls of the opening.

The first connection pattern may be formed in a layer different from that of the first opening sensor patterns with an insulating layer interposed therebetween, wherein the first connection pattern may be connected to the first opening sensor patterns through a contact hole penetrating the insulating layer.

The first connection pattern may include a low-resistance metal.

The first connection pattern may be formed of the same material on the same layer as the first opening sensor patterns.

The touch sensor may further include additional routing lines connected to other portions of the first sensor electrode which includes the first opening sensor patterns to extend to the periphery of the touch active region.

The second sensor patterns may include second opening sensor patterns disposed adjacent to respective portions of the opening in the first direction, and the second opening sensor patterns may be separated from each other.

The touch sensor may further include additional routing lines connected to other portions of the second sensor electrodes to extend to the periphery of the touch active region.

The touch sensor may further include a second connection pattern disposed detouring the opening, the second connection pattern electrically connecting the second opening sensor patterns.

The second connection pattern may be formed in a layer different from that of the second opening sensor patterns of the second sensor patterns with an insulating layer interposed therebetween, and wherein the second connection pattern may be connected to the second opening sensor patterns of the second sensor patterns via a contact hole formed through the insulating layer.

According to one or more embodiments of the invention, a display device includes: a display panel including an opening at a portion of a display region; and a touch sensor including a touch active region corresponding to the opening and the display region, the touch sensor being disposed on the display panel, wherein the touch sensor may include: first sensor electrodes extending in a first direction and arranged in a second direction; second sensor electrodes extending in the second direction and arranged in the first direction; first routing lines respectively connected to first portions of the first sensor electrodes, the first routing lines extending to a first peripheral area adjacent to a first side of the touch active region; second routing lines respectively connected to second portions of the second sensor electrodes, the second routing lines extending to a second peripheral area adjacent to a second side of the touch active region, the second side being a side opposite to the first side with respect to the touch active region; additional routing lines respectively connected to other portions of the first sensor electrodes that are separated by the opening, the additional routing lines extending to the second peripheral area; and a shielding electrode extending to the second peripheral area, the shielding electrode being disposed between the second routing lines and the additional routing lines, wherein the first and second portions of the opening may include generally opposed first and second sides.

The portions of the first and second sensor electrodes to which the first and second routing lines are respectively connected may include distal ends of the first and second sensor electrodes, respectively.

According to one or more embodiments of the invention, a display device includes: a display panel including an opening at a portion of a display region; and a touch sensor including a touch active region corresponding to the opening and the display region, the touch sensor being disposed on the display panel, wherein the touch sensor may include: a plurality of first sensor electrodes each including first sensor patterns extending in a first direction, the plurality of first sensor electrodes being arranged in a second direction intersecting the first direction; a plurality of second sensor electrodes each including second sensor patterns extending in the second direction, the plurality of second sensor electrodes being arranged in the first direction; and a connection pattern electrically connecting a first opening sensor pattern of the first sensor patterns disposed adjacent to a first portion of the opening and a second opening sensor pattern of the first sensor patterns disposed adjacent to a second portion of the opening, the second portion being generally opposite to the first portion and the connection pattern extending around but not into the opening, wherein the first portion and the second portion of the opening may include generally opposed first and second sides, and wherein the connector may include a connection pattern.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

Example embodiments will now be described more fully hereinafter with reference to the accompanying drawings; however, they may be embodied in different forms and should not be construed as limited to the exemplary embodiments set forth herein. Rather, these embodiments are provided so that this disclosure will be thorough and complete, and will fully convey the scope of the example embodiments to those skilled in the art.

Figure 1:
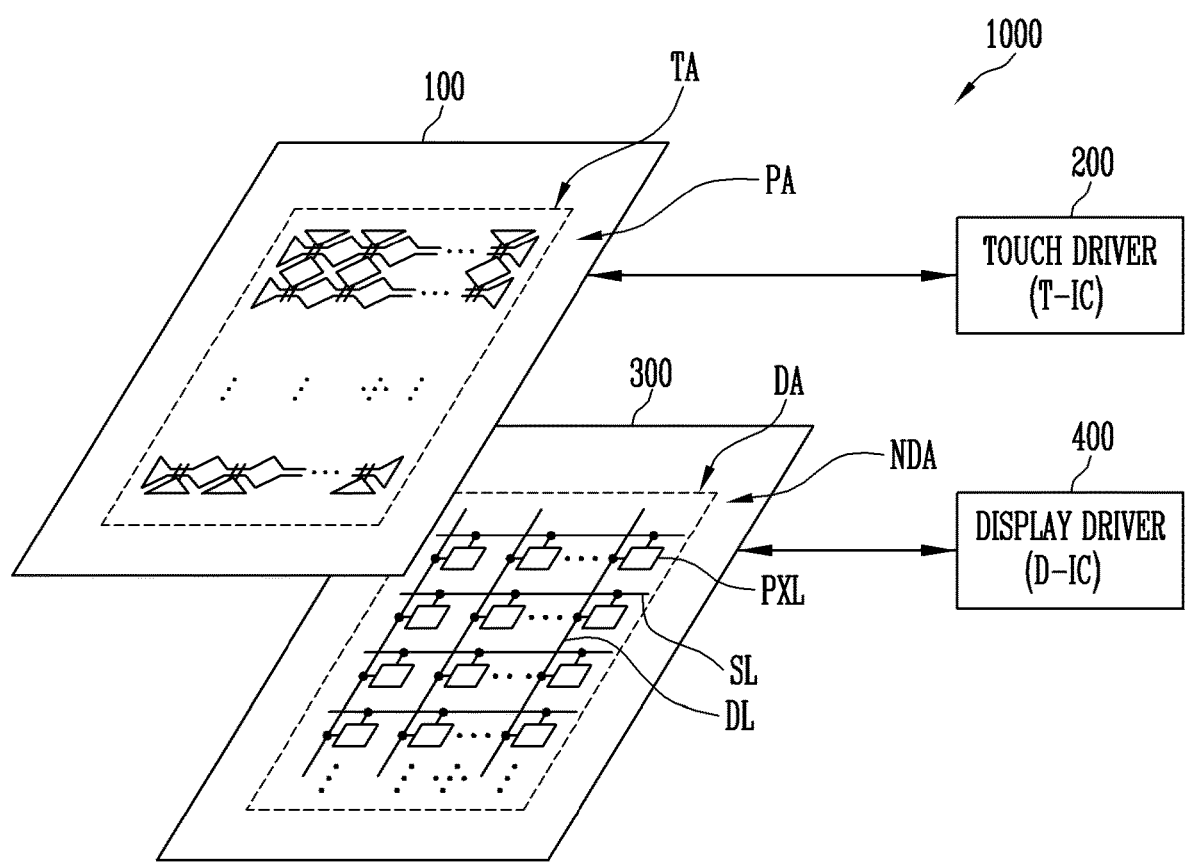

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 1 is a schematic view illustrating a display device constructed according to an exemplary embodiment of the invention.

Figure 2A:
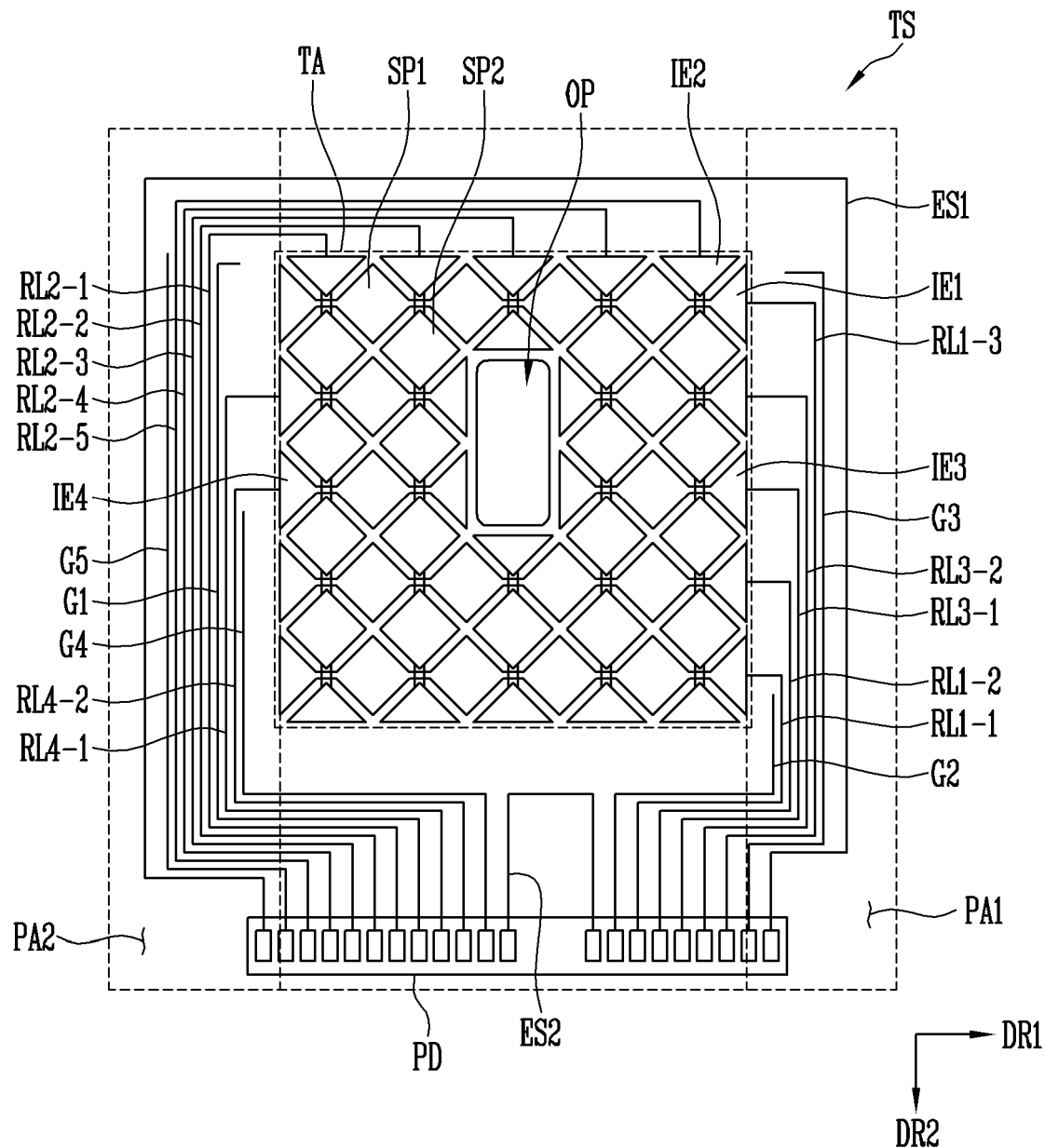

FIG. 2A is a view illustrating an example of a touch sensor included in the display device of FIG. 1.

Figure 2B:
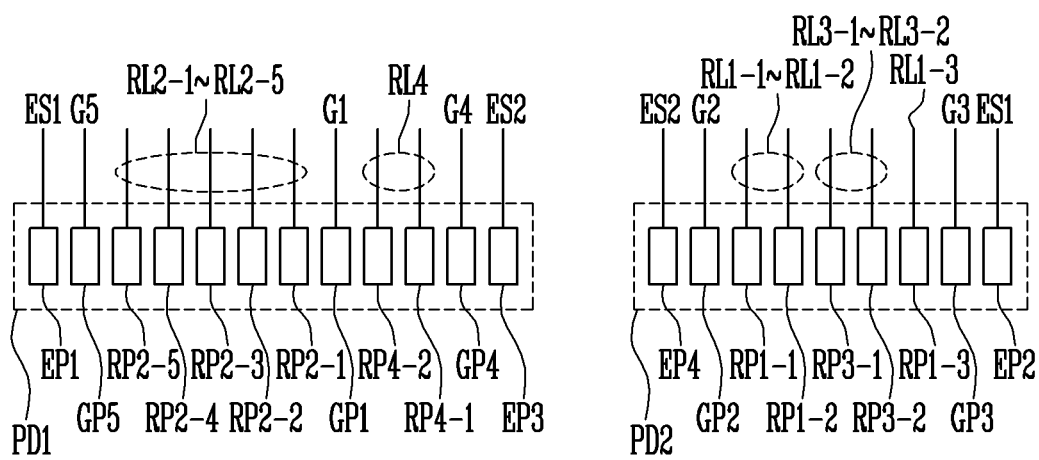

FIG. 2B is a view illustrating an example of an arrangement of lines and pads, which are included in the touch sensor of FIG. 2A.

Figure 3:
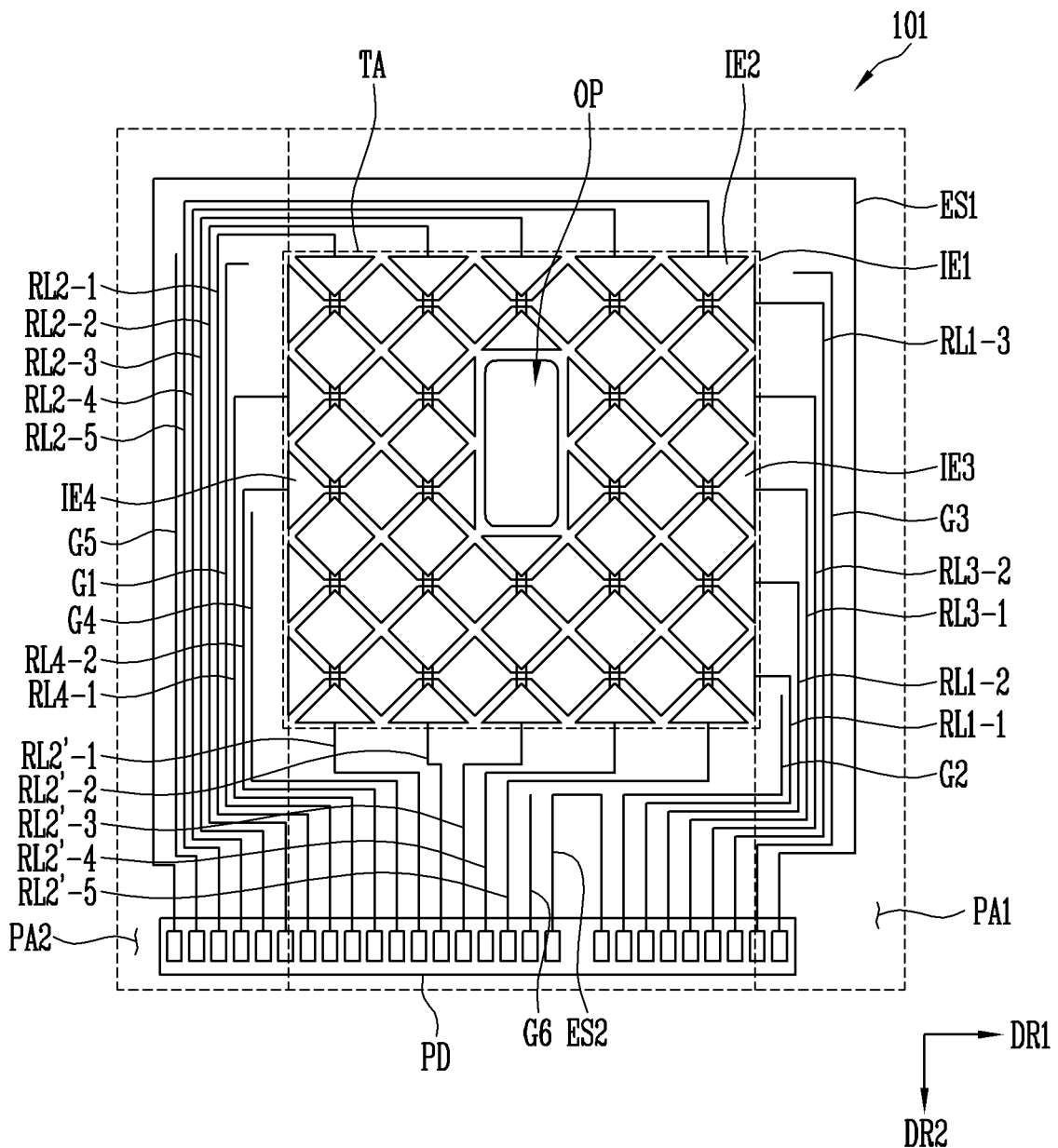

FIG. 3 is a view illustrating another example of the touch sensor included in the display device of FIG. 1.

Figure 4A:
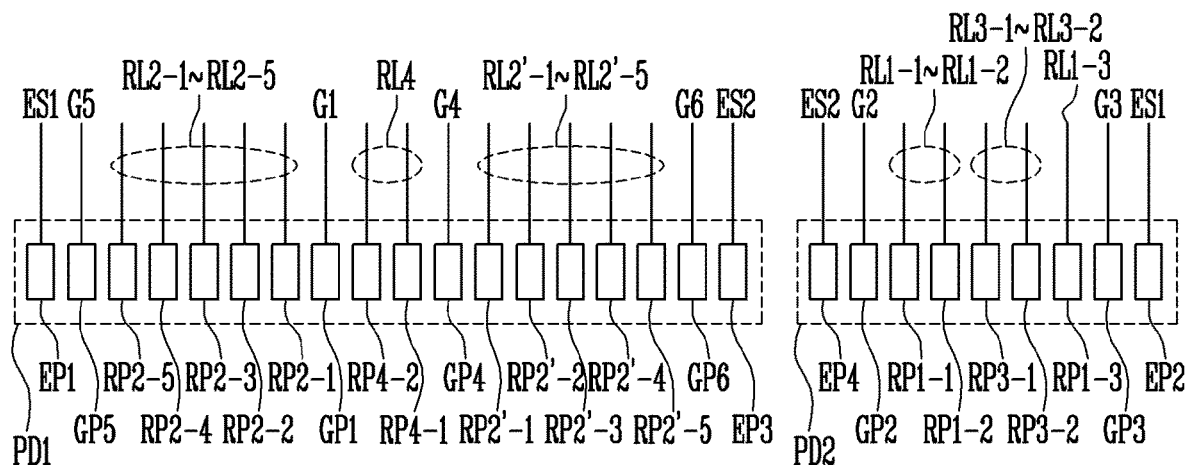

FIG. 4A is a view illustrating an example of an arrangement of lines and pads, which are included in the touch sensor of FIG. 3.

Figure 4B:
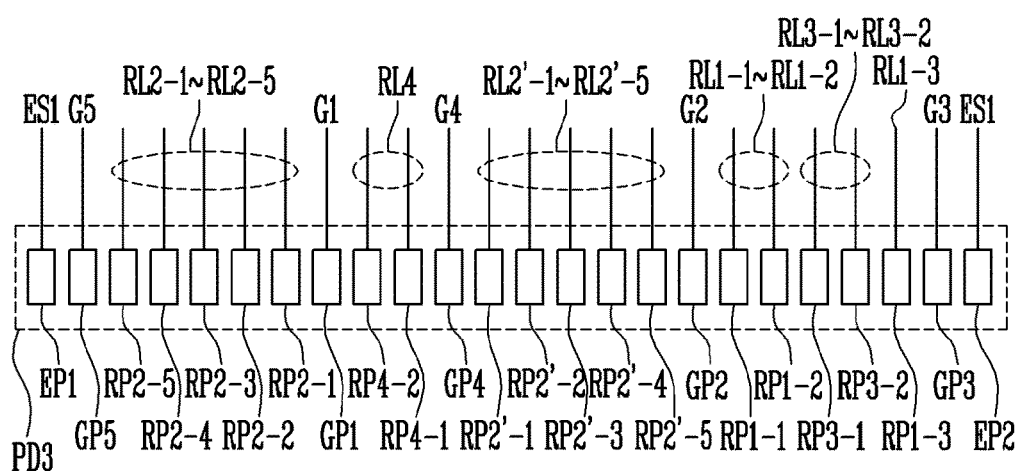

FIG. 4B is a view illustrating another example of the arrangement of the lines and the pads, which are included in the touch sensor of FIG. 3.

Figure 5:
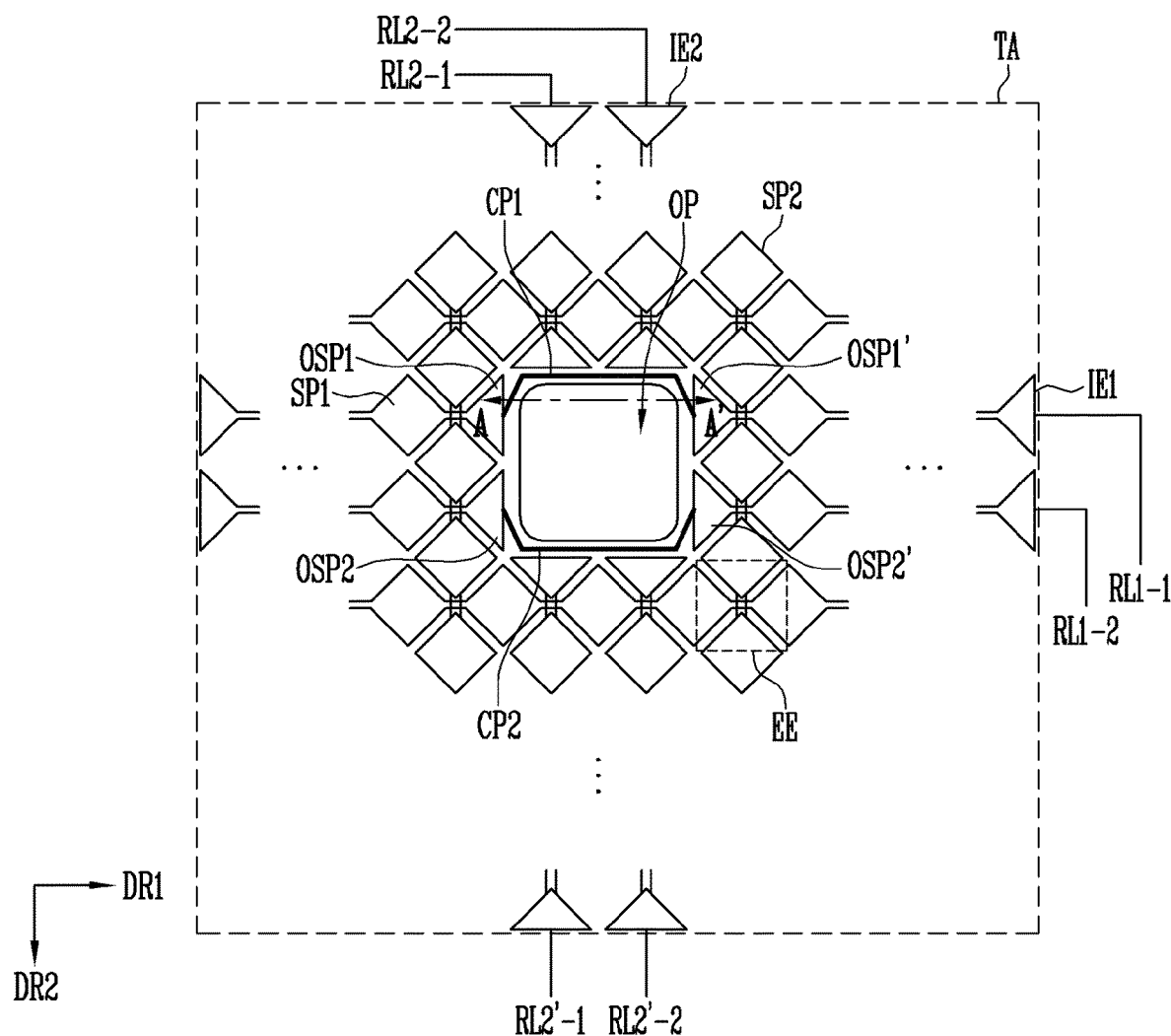

FIG. 5 is a view illustrating an example of a touch sensor constructed according to an exemplary embodiment of the invention.

Figure 6:
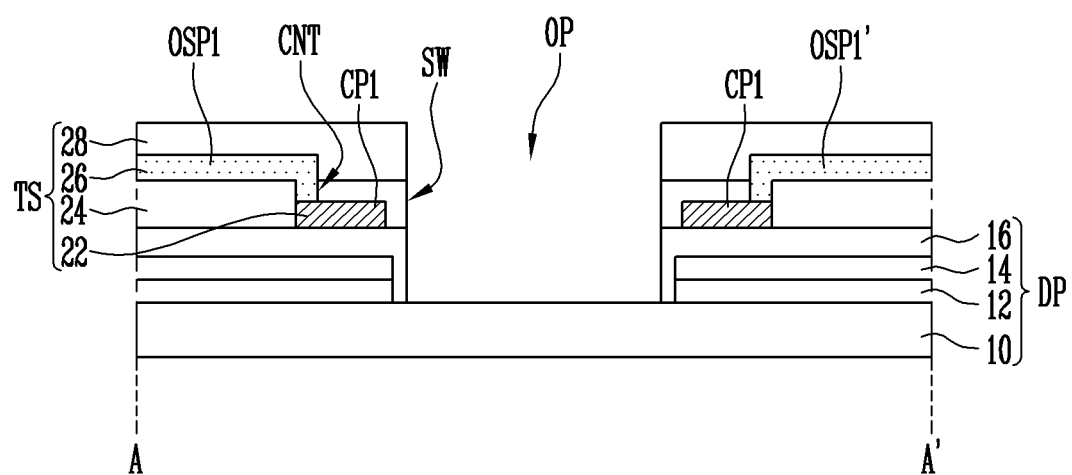

FIG. 6 is a sectional view illustrating an example of a section taken along a sectional line A-A' of the touch sensor of FIG. 5.

Figure 7:
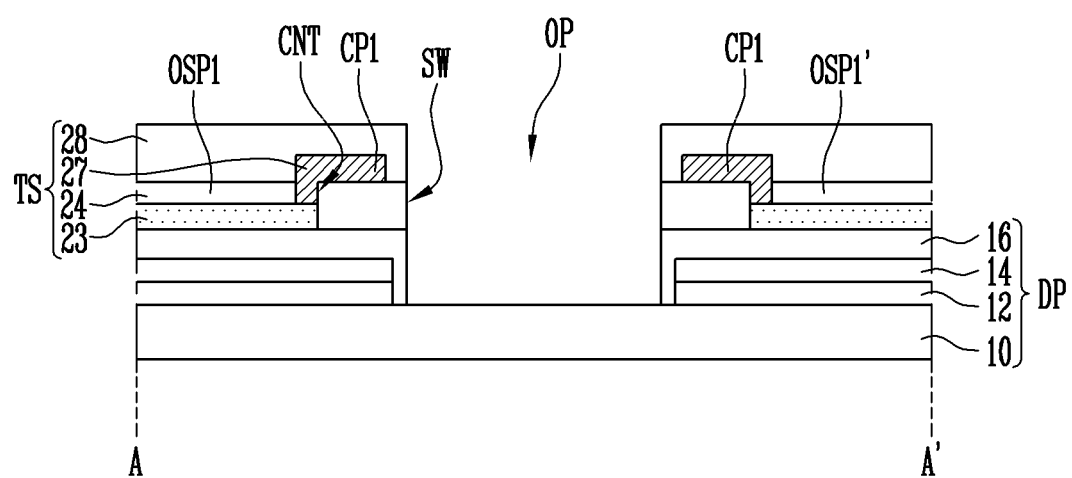

FIG. 7 is a sectional view illustrating another example of the section taken along the sectional line A-A' of the touch sensor of FIG. 5.

Figure 8:
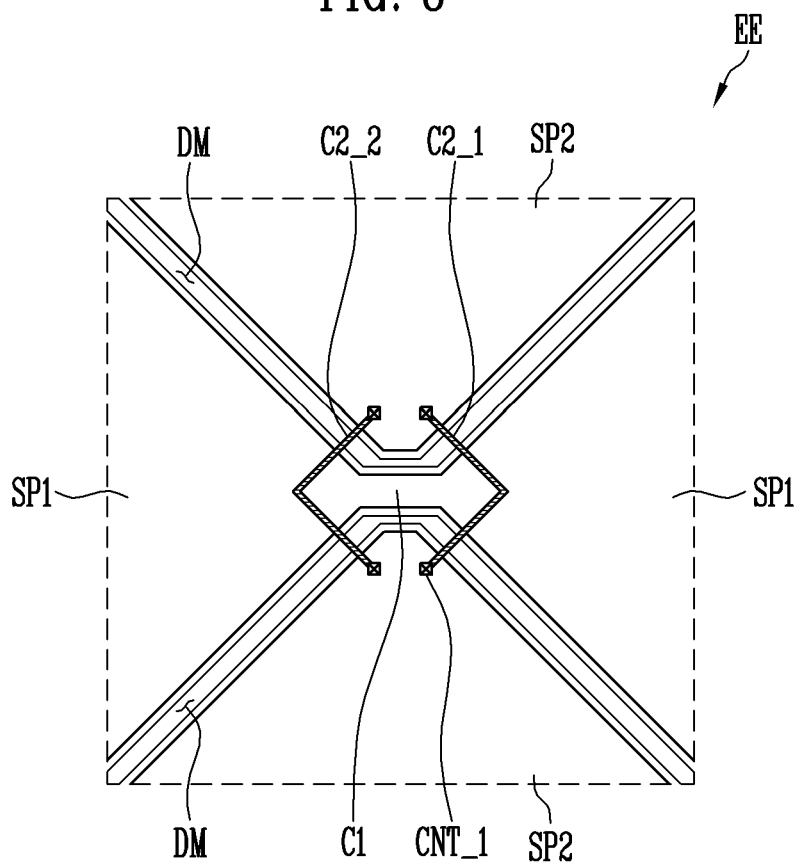
Figure 9:
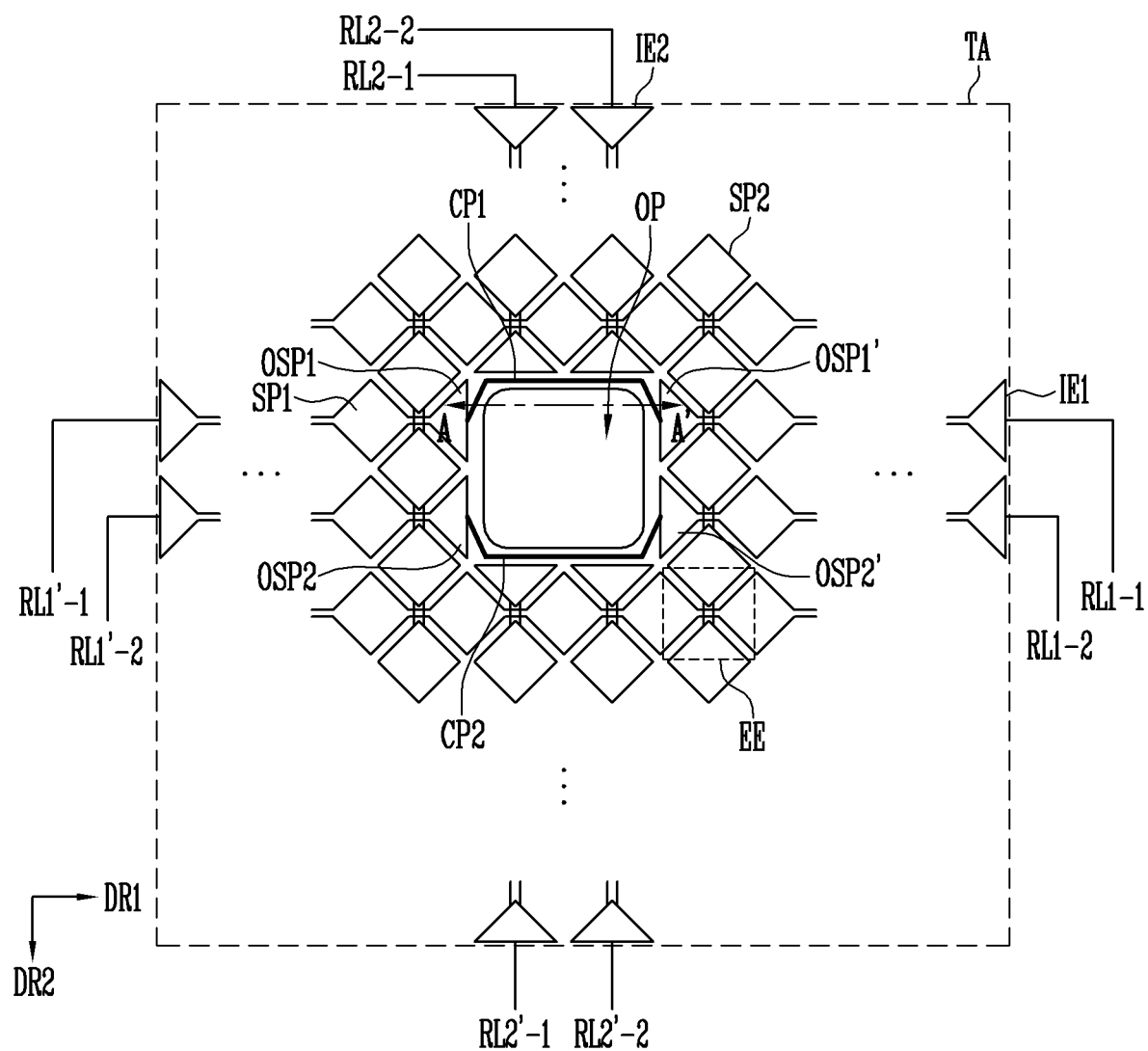

FIG. 8 is a view illustrating an example of an intersection region between two lines of intersecting sensor patterns included in the touch sensor of FIG. 5.

FIGS. 9, 10, 11, and 12 are views illustrating examples of the touch sensor of FIG. 5.

Figure 13A:
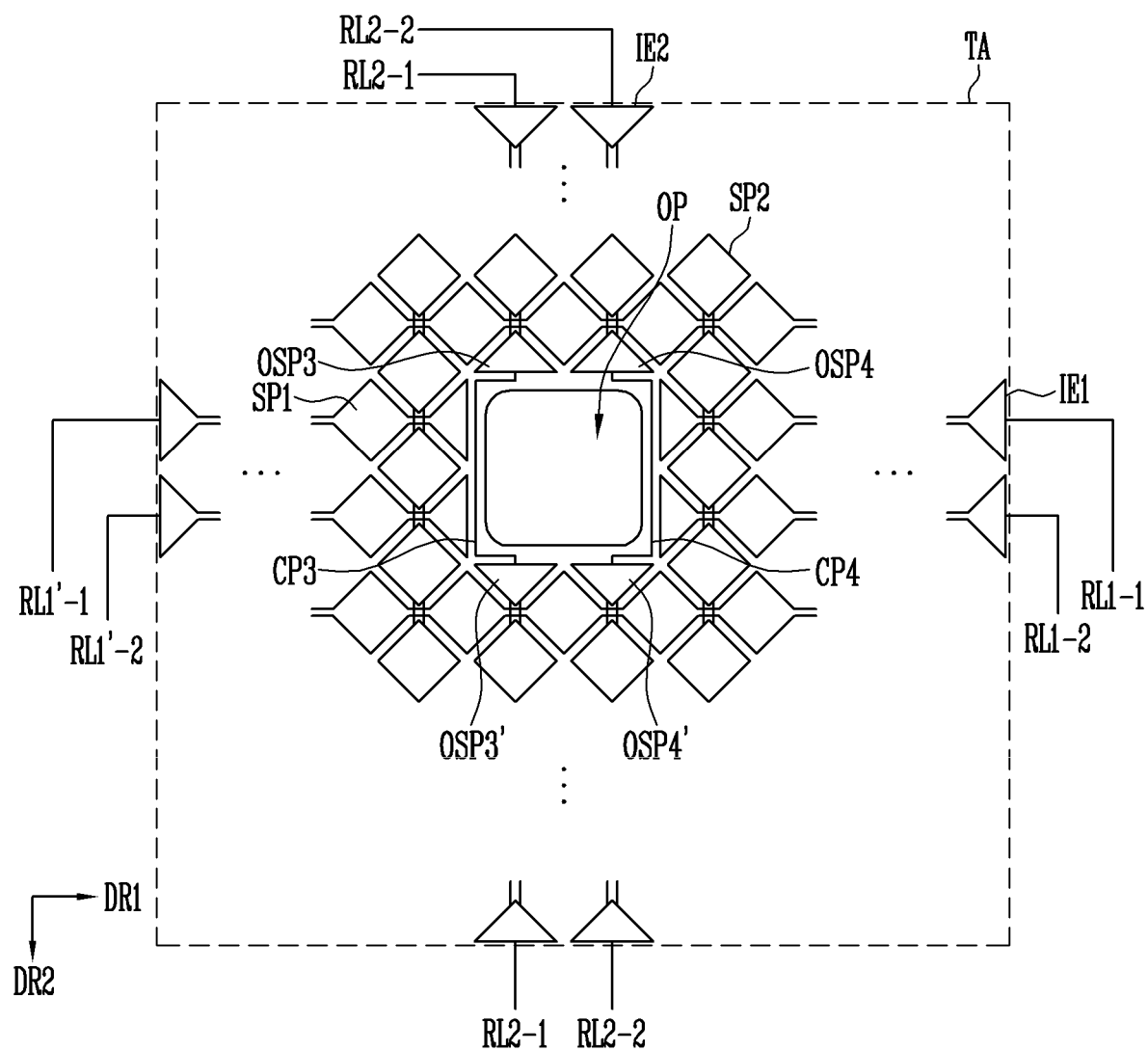
Figure 13B:
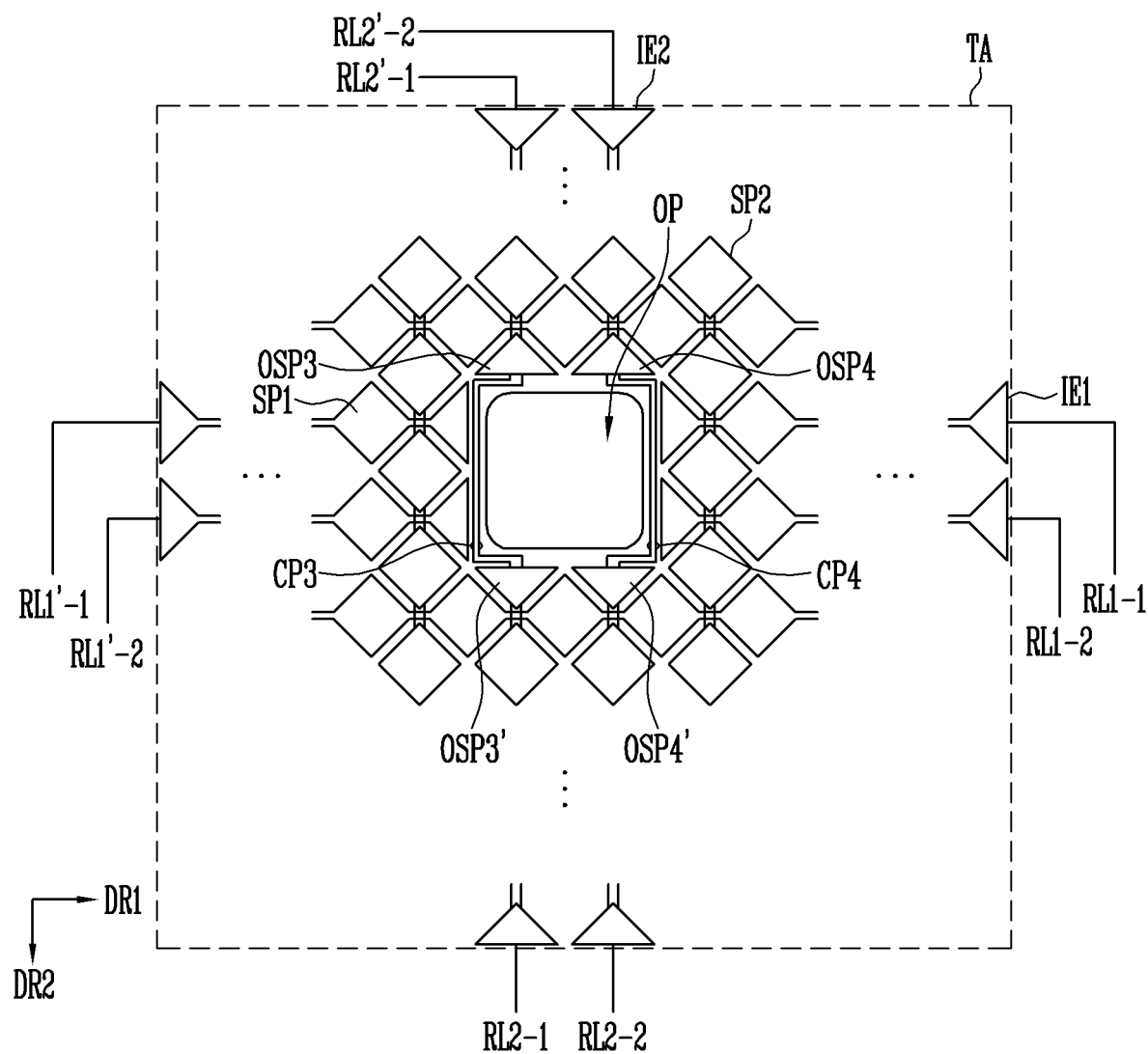

FIGS. 13A and 13B are views illustrating examples of a touch sensor constructed according to another exemplary embodiment of the invention.

Figure 14:
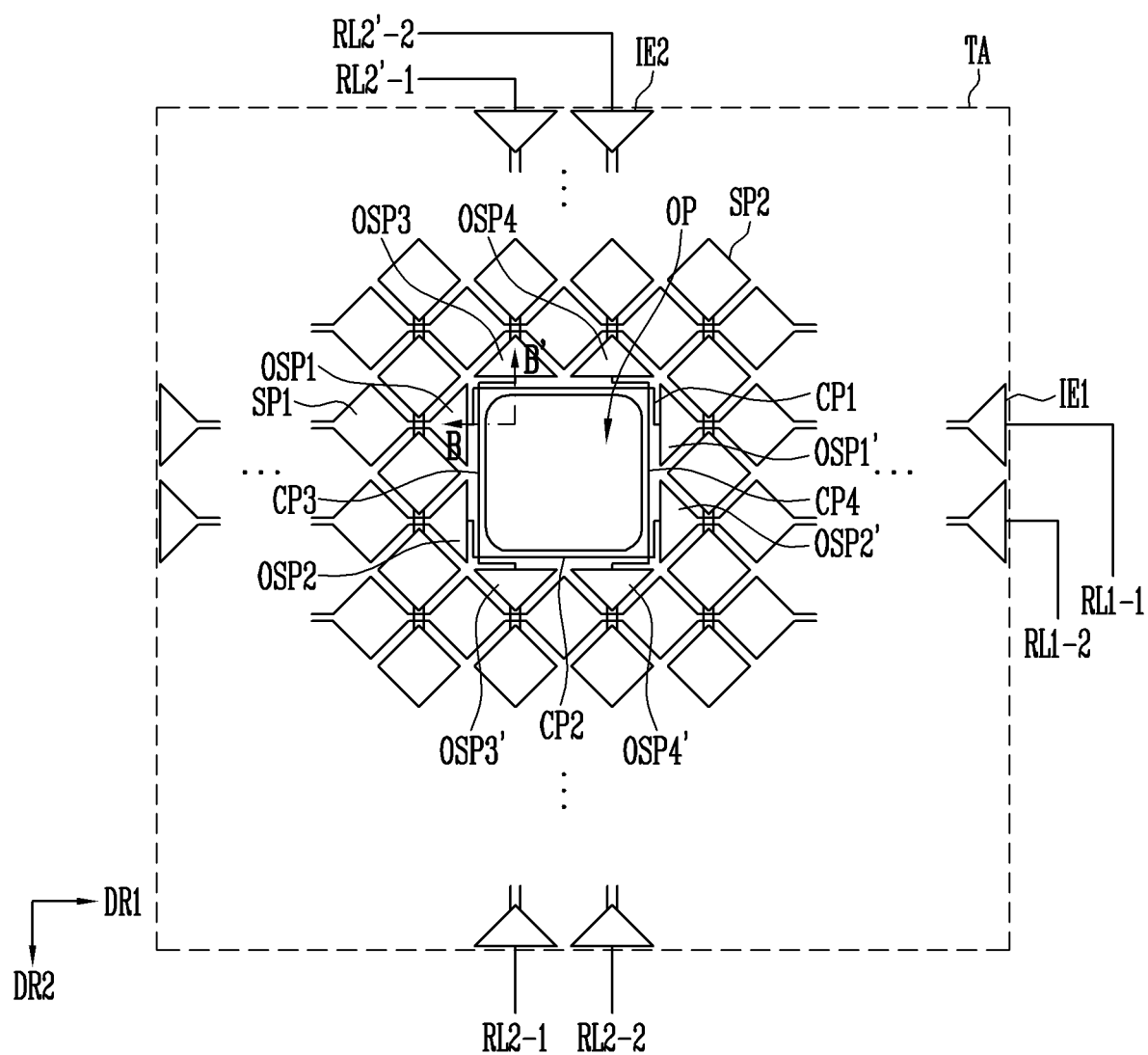

FIG. 14 is a view illustrating an example of a touch sensor constructed according to yet another exemplary embodiment of the invention.

Figure 15:
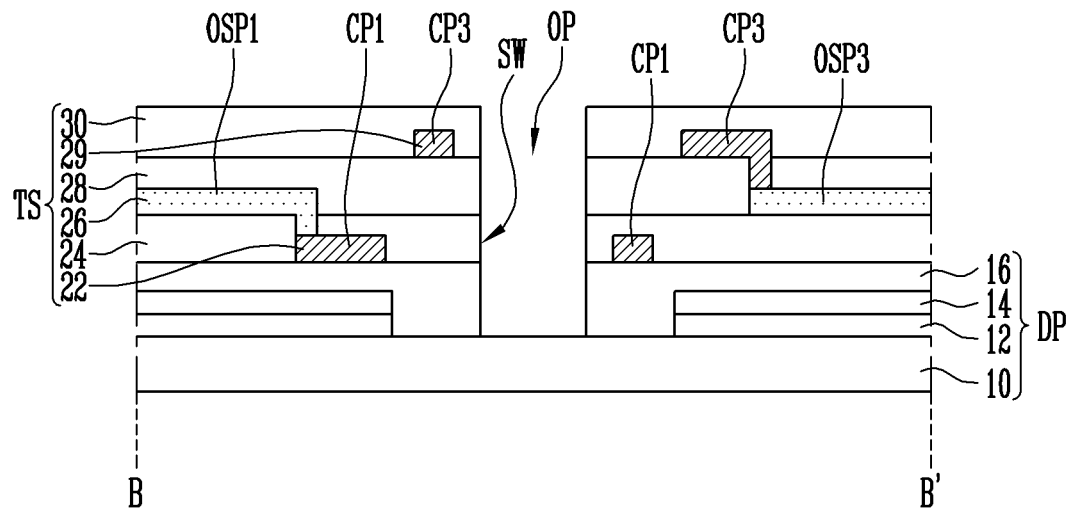

FIG. 15 is a sectional view illustrating an example of a section taken along a sectional line B-B' of the touch sensor of FIG. 14.

Figure 16:
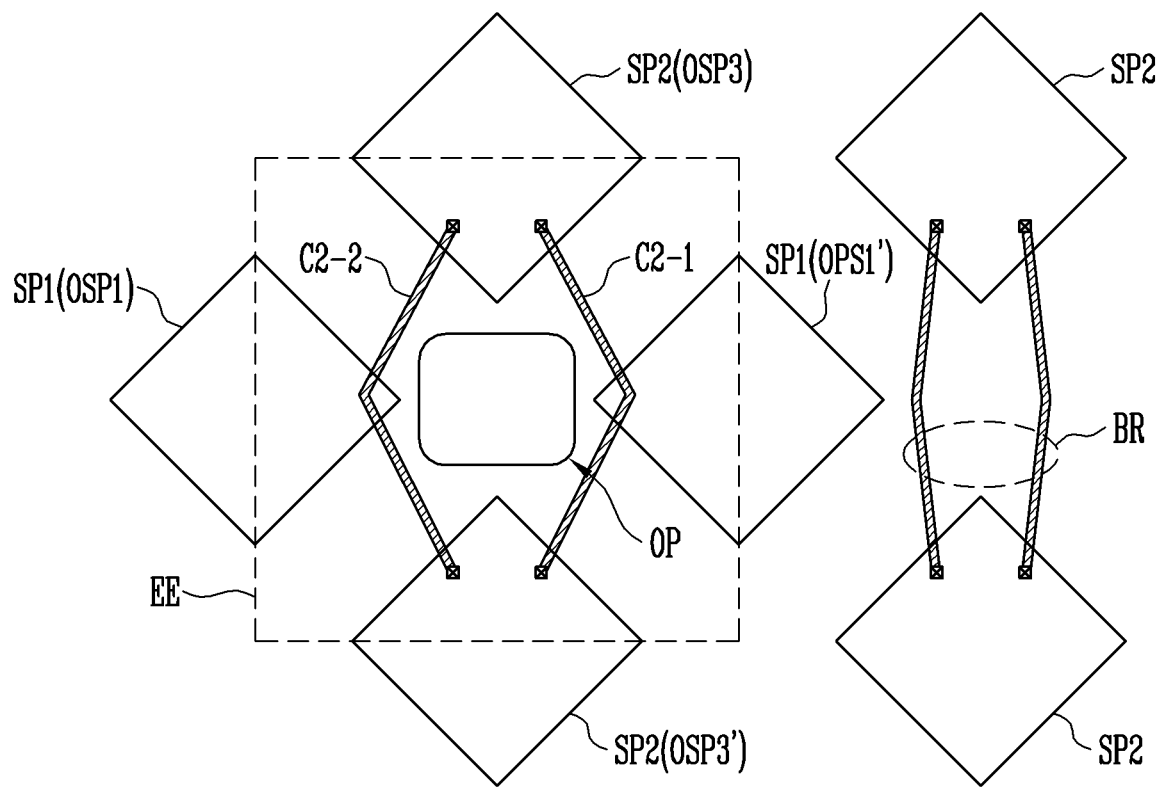

FIG. 16 is a view illustrating an example of an opening and sensor patterns around the opening, which are included in a touch sensor constructed according to an exemplary embodiment of the invention.

Figure 17:
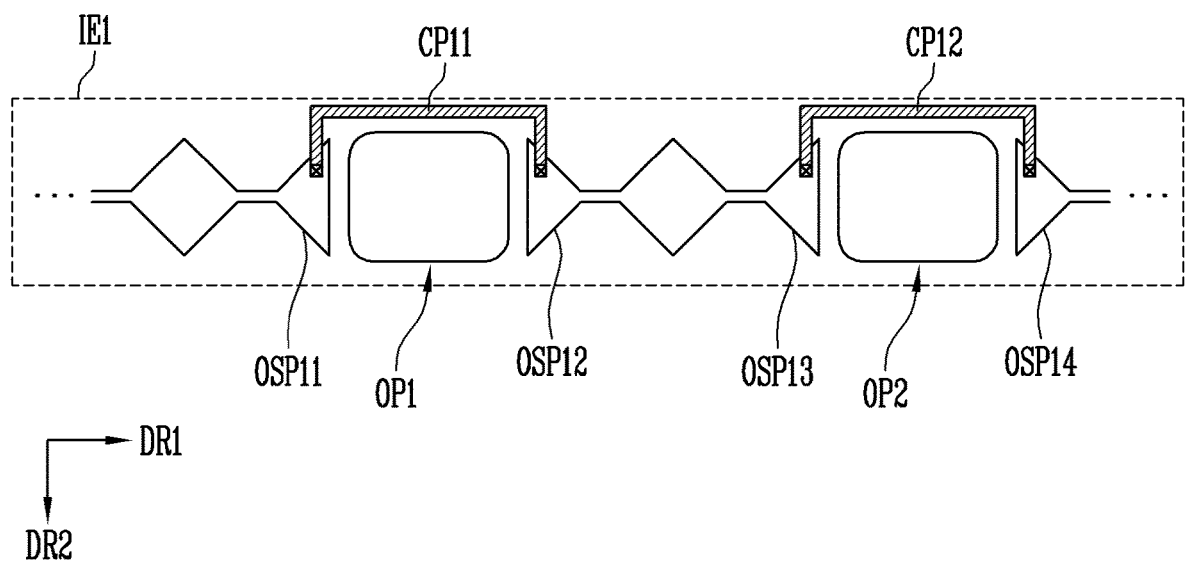

FIG. 17 is a view illustrating another example of the opening and the sensor patterns around the opening, which are included in the touch sensor constructed according to an exemplary embodiment of the invention.

Figure 18:
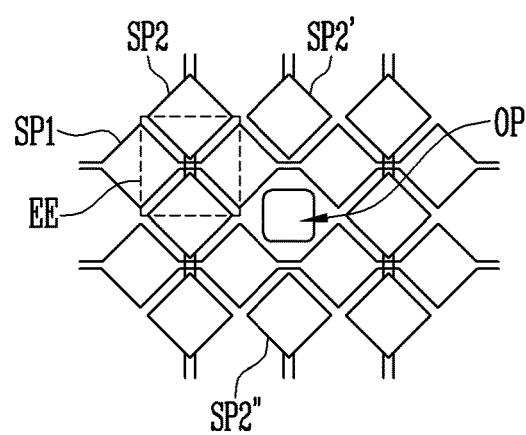

FIG. 18 is a view illustrating another example of the opening and the sensor patterns around the opening, which are included in the touch sensor constructed according to an exemplary embodiment of the invention.

Figure 19:
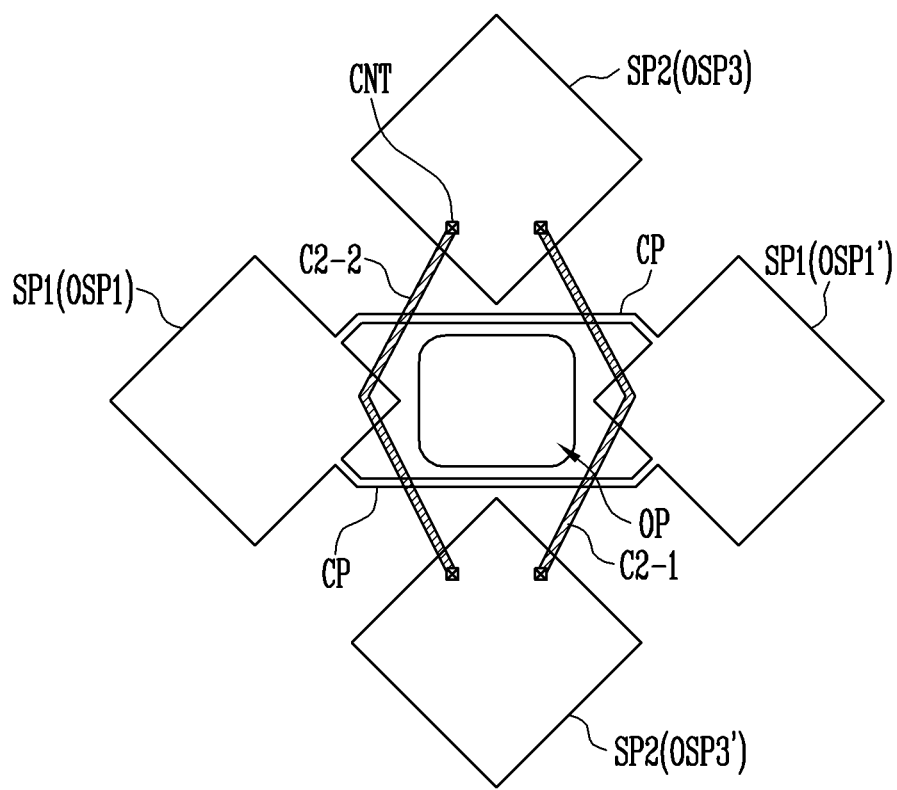

FIG. 19 is a view illustrating another example of the opening and the sensor patterns around the opening, which are included in the touch sensor constructed according to an exemplary embodiment of the invention.

FIG. 20 is a view illustrating an example of a touch sensor according to another exemplary embodiment of the invention.

DETAILED DESCRIPTION

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

FIG. 1 is a schematic view illustrating a display device constructed according to an exemplary embodiment of the invention.

Referring to FIG. 1, the touch display device 1000 according to the exemplary embodiment of the invention includes a sensor unit 100, a touch driver 200, a display panel 300, and a display driver 400. The sensor unit 100 and the touch driver 200 constitute a touch sensor.

Meanwhile, although a case where the sensor unit 100 and the display panel 300 are separated from each other is illustrated in the exemplary embodiment of FIG. 1, the invention is not limited thereto. For example, the sensor unit 100 and the display panel 300 may be integrally manufactured.

In some exemplary embodiments, the sensor unit 100 may be provided on at least one region of the display panel 300. For example, the sensor unit 100 may be provided on at least one surface of the display panel 300 to overlap with the display panel 300. In an exemplary embodiment, the sensor unit 100 may be directly formed on at least one of both surfaces of the display panel 300, or be formed in the display panel 300. In another exemplary embodiment, the sensor unit 100 may be adhered to one surface of the display panel 300 using an adhesive layer/adhesive member.

The sensor unit 100 includes a touch active region TA capable of sensing a touch input and a non-active region (or peripheral region) PA surrounding at least a portion of the touch active region TA. In some exemplary embodiments, the touch active region TA may be disposed to correspond to a display region DA of the display panel 300, and the non-active region PA may be disposed to correspond to a non-display region NDA of the display panel 300. An opening OP may be formed at a portion of the touch active region TA and the display region DA corresponding thereto. A camera, a sensor, a speaker, a receiver, a physical button, etc. may be disposed in the opening.

In some exemplary embodiments, the touch sensor may include a self-capacitive touch sensor and/or a mutual-capacitive touch sensor.

Sensor electrodes included in the sensor unit 100 may be distributed in the touch active region TA to detect the position of a touch input when the touch input occurs in the touch active region TA.

Routing lines are connected to the respective sensor electrode. A predetermined driving signal is applied to some sensor electrodes through some routing lines. In addition, a change in capacitance generated in the sensor electrode is detected through the routing line.

The touch driver 200 may be electrically connected to the sensor unit 100 to drive and sense the sensor unit 100. In an example, the touch driver 200 may detect a touch input by supplying a driving signal to the sensor unit 100 and then receiving a sensing signal corresponding to the driving signal from the sensor unit 100.

The display panel 300 includes the display region DA and the non-display region NDA surrounding at least one region of the display region DA. The display region DA may be provided with a plurality of scan lines SL, a plurality of data lines DL, and a plurality of pixels PXL connected to the scan lines SL and the data line DL. The non-display region NDA may be provided with various types of driving signals for driving the pixels PXL and/or lines for supplying a driving power source.

According to the exemplary embodiments of the invention, the type of the display panel 300 is not particularly limited. For example, the display panel 300 may be a self-luminescent display panel such as an organic light emitting display panel (OLED panel).

Alternatively, the display panel 300 may be a non-luminescent display panel such as a liquid crystal display panel (LCD panel), an electrophoretic display panel (EDP panel), an electro-wetting display panel (EWD panel), and a quantum dot display panel.

The display driver 400 is electrically connected to the display panel 300 to supply signals required to drive the display panel 300. In an example, the display driver 400 may include at least one of a scan driver for supplying a scan signal to the scan lines SL, a data driver for supplying a data signal to the data lines DL, and a timing controller for driving the scan driver and the data driver. In some exemplary embodiments, the scan driver, the data driver, and/or the timing controller may be integrated in one display IC (D-IC), but the invention is not limited thereto. For example, in another exemplary embodiment, at least one of the scan driver, the data driver, and the timing controller may be integrated or mounted on the display panel 300.

FIG. 2A is a view illustrating an example of the touch sensor included in the display device of FIG. 1. FIG. 2B is a view illustrating an example of an arrangement of lines and pads, which are included in the touch sensor of FIG. 2A.

Referring to FIGS. 2A and 2B, the touch sensor TS may include first sensor electrodes IE1, second sensor electrodes IE2, a third sensor electrode IE3, a fourth sensor electrode IE4, an opening OP, first routing lines RL1-1, RL1-2, and RL1-3, second routing lines RL2-1, RL2-2, RL2-3, RL2-4, and RL2-5, third routing lines RL3-1 and RL3-2, fourth routing lines RL4-1 and RL4-2, and a first shielding electrode G1. The touch sensor TS may further include additional shielding electrodes G2, G3, G4, and G5, electrostatic protection lines ES1 and ES2, and the like.

The touch sensor TS may include a touch active region TA and a peripheral region surrounding at least a portion of the touch active region TA. The opening OP may be formed to vertically penetrate a plane of the touch active region TA. The shape, size, and number of openings OP are not limited, and may be applied in various forms according to embodiments and purposes. For example, a camera, a sensor, a speaker, a receiver, a physical button, etc. may be disposed in the opening OP.

Each of the first, second, third, and fourth sensor electrodes IE1, IE2, IE3, and IE4 may be formed through a repetitive arrangement of a sensor pattern. In an exemplary embodiment, each of the first, third, and fourth sensor electrodes IE1, IE3, and IE4 may have a shape extending in a first direction DR1, and be arranged in a second direction DR2. FIG. 2 illustrates that the sensor pattern has a rhombus shape, the shape of the sensor pattern is not limited thereto.

In this exemplary embodiment, the third sensor electrode IE3 and the fourth sensor electrode IE4 may be substantially a portion selected from the arrangement of the first sensor electrodes IE1, and have the substantially same function and shape as the first sensor electrodes IE1. That is, the third sensor electrode IE3 and the fourth sensor electrode IE4 may mean predetermined first sensor electrodes IE1 separated from each other by the opening OP. In this exemplary embodiment, for convenience of description, first sensor electrodes IE1 separated from each other at respective sides of the opening OP are defined as the third sensor electrode IE3 and the fourth sensor electrode IE4, respectively. In addition, each of the third and fourth electrodes IE3 and IE4 may be provided in singular or plural numbers depending on the size, etc. of the opening OP. However, the third and fourth electrodes IE3 and IE4 correspond one to one.

For example, a portion of the first sensor electrode separated by the opening OP and disposed at a first side of the opening OP may be defined as the third electrode IE3, and a portion of the first sensor electrode separated by the opening OP and disposed at a second side of the opening OP, which is opposite to the first side, may be defined as the fourth sensor electrode IE4. For example, referring to FIG. 2A, the first side may be a right side of the opening OP, and the second side may be a left side of the opening OP. In addition, a third side of the opening OP may be an upper side of the opening OP, and a fourth side of the opening OP may be a lower side of the opening OP.

Each of the first, third, and fourth electrodes IE1, IE3, and IE4 may be arranged in the second direction DR2. The second direction DR2 may be a direction substantially orthogonal to the first direction DR2. Each of the first, third, and fourth electrodes IE1, IE3, and IE4 may have a shape in which first sensor patterns SP1 are connected to each other. The first, third, and fourth electrodes IE1, IE3, and IE4 may sense an external input (touch, etc.), using a mutual cap method and/or a self-cap method.

The second sensor electrodes IE2 may extend in the second direction DR2, and be arranged in the first direction DR1 while intersecting the first sensor electrodes IE1. In an exemplary embodiment, the second sensor electrodes IE2 may include second sensor patterns SP2 and connection parts having a bridge shape, which connect the second sensor patterns SP2 to each other.

In an exemplary embodiment, some of the second sensor electrodes IE2 may also be separated from each other by the opening OP.

The first to fourth sensor electrodes IE1, IE2, IE3, and IE4 and conductive patterns connecting the first to fourth sensor electrodes IE1, IE2, IE3, and IE4 are not in contact with a sidewall of the opening OP. That is, an electrode material of the first to fourth sensor electrodes IE1, IE2, IE3, and IE4 and a conductive layer pattern are not exposed to the sidewall of the opening OP.

The first routing lines RL1-1, RL1-2, and RL1-3 may be connected to one ends of the respective first sensor electrodes EL1. The first routing lines RL1-1, RL1-2, and RL1-3 may extend in a first peripheral region PA1 adjacent to the first side. The extending first routing lines RL1-1, RL1-2, and RL1-3 may be connected to a pad unit PD formed at one side of the peripheral region. In an exemplary embodiment, the pad unit PD may be connected to a Flexible Printed Circuit (FPC) or the like, which includes a touch driver.

In an exemplary embodiment, the first routing lines RL1-1, RL1-2, and RL1-3 may transfer signals changed by a change in capacitance in the touch active region TA.

The second routing lines RL2-1, RL2-2, RL2-3, RL2-4, and RL2-5 may be connected to one ends of the respective second sensor electrodes EL2. The second routing lines RL2-1, RL2-2, RL2-3, RL2-4, and RL2-5 may extend in a second peripheral region PA2 adjacent to the second side. The extending second routing lines RL2-1, RL2-2, RL2-3, RL2-4, and RL2-5 may be connected to the pad unit PD. In an exemplary embodiment, the second routing lines RL2-1, RL2-2, RL2-3, RL2-4, and RL2-5 may continuously transfer a predetermined driving signal to the second sensor electrodes IE2. However, this is merely illustrative, and functions of the first and second routing lines are not limited thereto.

The third routing lines RL3-1 and RL3-2 may be connected to one ends of the respective third sensor electrodes IE3, and extend in the first peripheral region PA1. That is, the third routing lines RL3-1 and RL3-2 may be substantially some of the first routing lines RL1-1, RL1-2, and RL1-3. In other words, the first routing lines RL1-1, RL1-2, and RL1-3 and the third routing lines RL3-1 and RL3-2 may be disposed to be spaced apart from each other according to positions of the first and third sensor electrodes IE1 and IE3 arranged in the second direction DR2.

The fourth routing lines RL4-1 and RL4-2 may be connected to one ends of the respective sensor electrodes EL4, and extend in the second peripheral region PA2. The extending fourth routing lines RL4-1 and RL4-2 may be connected to the pad unit PD. The fourth routing lines RL4-1 and RL4-2 may be disposed to be spaced apart from the second routing lines RL2-1, RL2-2, RL2-3, RL2-4, and RL2-5.

Routing lines (i.e., the fourth routing lines RL4-1 and RL4-2) may be connected to only the fourth electrodes IE4 at the other ends of the first sensor electrodes IE1. According to the exemplary embodiment, the second sensor electrode IE2 separated by the opening OP in the second direction DR2 may be electrically connected to each other by at least one connection pattern disposed detouring (or around but not into) the opening OP.

In an exemplary embodiment, the third and fourth sensor electrodes IE3 and IE4 may be electrically insulated from each other. The fourth routing lines RL4-1 and RL4-2 are required to sense a touch in a region in which the fourth sensor electrode IE4 is disposed. A sensing signal sensed by the third sensor electrode IE3 may be transferred through the third routing lines RL3-1 and RL3-2, and a sensing signal sensed by the fourth sensor electrode IE4 may be transferred through the fourth routing lines RL4-1 and RL4-2.

In another exemplary embodiment, the third sensor electrode IE3 and the fourth sensor electrode IE4 may be electrically connected to each other by a predetermined connection pattern disposed detouring the opening OP. Accordingly, touch sensitivity and sensing uniformity in the first direction DR1, which corresponds to the opening OP, may be degraded due to a voltage drop and an increase in RC delay, which are caused by the connection pattern. The third routing line RL3-1 and RL3-2 and the fourth routing lines RL4-1 and RL4-2 are respectively connected to the third and fourth sensor electrodes IE3 and IE4, so that the RC delay can be reduced, and the sensing sensitivity and sensing uniformity can be improved.

The first shielding electrode G1 may extend in the second peripheral region PA2, and be disposed between the second routing lines RL2-1, RL2-2, RL2-3, RL2-4, and RL2-5 and the fourth routing lines RL4-1 and RL4-2. The first shielding electrode G1 may block electrical influence such as interference or coupling between the second routing lines RL2-1, RL2-2, RL2-3, RL2-4, and RL2-5 and the fourth routing lines RL4-1 and RL4-2. The first shielding electrode G1 may be a floating electrode or ground electrode. In an exemplary embodiment, the length of the first shielding electrode G1 in the second direction DR2 in the second peripheral region PA2 may be shorter than those of the second routing lines RL2-1, RL2-2, RL2-3, RL2-4, and RL2-5 and be longer than those of the fourth routing lines RL4-1 and RL4-2.

In an exemplary embodiment, second to fifth shielding electrodes G2, G3, G4, and G5 may be further disposed in the peripheral region. Each of the second to fifth shielding electrodes G2, G3, G4, and G5 may also be a floating electrode or ground electrode.

The second shielding electrode G2 may be disposed at the inside of the first routing lines RL1-1, RL1-2, and RL1-3. The second shielding electrode G2 may block electrical influence between the first routing lines RL1-1, RL1-2, and RL1-3 and sensor electrodes disposed adjacent thereto.

The third shielding electrode G3 may be disposed at the outside of the first routing lines RL1-1, RL1-2, and RL1-3 and the third routing lines RL3-1 and RL3-2. The third shielding electrode G3 may block electrical influence between the first routing lines RL1-1, RL1-2, and RL1-3 and other signal lines disposed at the outside thereof.

The fourth shielding electrode G4 may be disposed at the inside of the fourth routing lines RL4-1 and RL4-2. The fourth shielding electrode G4 may block electrical influence between the fourth routing lines RL4-1 and RL4-2 and sensor electrodes disposed adjacent thereto.

The fifth shielding electrode G5 may be disposed at the outside of the second routing lines RL2-1, RL2-2, RL2-3, RL2-4, and RL2-5. The fifth shielding electrode G5 may block electrical influence between the second routing lines RL2-1, RL2-2, RL2-3, RL2-4, and RL2-5 and other signal lines disposed at the outside thereof.

In an exemplary embodiment, a first electrostatic protection line ES1 disposed in an open loop shape to surround the first to fourth routing lines RL1-1, RL1-2, RL1-3, RL2-1, RL2-2, RL2-3, RL2-4, RL2-5, RL3-1, RL3-2, RL4-1, and RL4-2 along the circumference of the touch active region TA may be further included in the peripheral region. The first electrostatic protection line ES1 may be a ground line. The first electrostatic protection line ES1 may be formed to surround the outermost edge of the first to fourth routing lines RL1-1, RL1-2, RL1-3, RL2-1, RL2-2, RL2-3, RL2-4, RL2-5, RL3-1, RL3-2, RL4-1, and RL4-2 and the shielding electrodes G1, G2, G3, G4, and G5. The first electrostatic protection line ES1 may protect the sensor electrodes EL1, EL2, EL3, and EL4 and the first to fourth routing lines RL1-1, RL1-2, RL1-3, RL2-1, RL2-2, RL2-3, RL2-4, RL2-5, RL3-1, RL3-2, RL4-1, and RL4-2 from static electricity introduced from the outside.

In an exemplary embodiment, a second electrostatic protection line ES2 disposed in an open loop shape between the second shielding electrode G2 and the fourth shielding electrode G4 may be further included in the peripheral region. The second electrostatic protection line ES2 may protect the sensor electrodes EL1, EL2, EL3, and EL4 and the first to fourth routing lines RL1-1, RL1-2, RL1-3, RL2-1, RL2-2, RL2-3, RL2-4, RL2-5, RL3-1, RL3-2, RL4-1, and RL4-2 from static electricity introduced from the outside.

Referring to FIG. 2B, the routing lines and the shielding electrodes may extend substantially identically to the pad unit PD in the position relationship between the routing lines and the shielding electrodes.

The pad unit PD may be divided into a first pad unit PD1 and a second pad unit PD2, and different FPCs for touch driving may be attached (or connected) to the respective pad units PD1 and PD2. For example, the FPC for touch driving may be attached in an FOG form to the peripheral region. However, this is merely illustrative, and the pad units PD1 and PD2 may constitute a single pad unit such that one FPC for touch driving may be attached to the pad units PD1 and PD2.

The first pad unit PD1 may sequentially include, in the first direction DR1, a pad EP1 connected to the first electrostatic protection line ES1, a pad GP5 connected to the fifth shielding electrode G5, pads RP2-1, RP2-2, RP2-3, RP2-4, and RP2-5 respectively connected to the second routing electrodes RL2-1, RL2-2, RL2-3, RL2-4, and RL2-5, a pad GP1 connected to the first shielding electrode G1, pads RP4-1 and RP4-2 respectively connected to the fourth routing lines RL4-1 and RL4-2, a pad GP4 connected to the fourth shielding electrode G4, and a pad EP3 connected to the second electrostatic protection line ES2.

The second pad unit PD2 may sequentially include, in the first direction DR1, a pad EP4 connected to the second electrostatic protection line ES2, a pad GP2 connected to the second shielding electrode G2, pads RP1-1, RP1-2, RP1-3, RP3-1, and RP3-2 respectively connected to the first and third routing lines RL1-1, RL1-2, RL1-3, RL3-1, and RL3-2, a pad GP3 connected to the third shielding electrode G3, and a pad EP2 connected to the first electrostatic protection line ES1.

As described above, in the touch sensor TS including the opening OP according to the exemplary embodiment of the invention, the routing lines (i.e., the third and fourth routing lines RL3-1, RL3-2, RL4-1, and RL4-2) are respectively disposed at both ends of the sensor electrodes (i.e., the third and fourth sensor electrodes EL3 and EL4) separated corresponding to the opening OP, so that an increase in the number of lines in the peripheral region can be minimized, and sensing sensitivity and sensing uniformity in the touch active region TA can be improved. Further, the first shielding electrode G1 is additionally inserted between the second routing lines RL2-1, RL2-2, RL2-3, RL2-4, and RL2-5 and the additionally disposed fourth routing lines RL4-1 and RL4-2, so that electrical influence between lines in the peripheral region can be reduced. Thus, touch sensing accuracy can be improved.

FIG. 3 is a view illustrating another example of the touch sensor included in the display device of FIG. 1. FIG. 4A is a view illustrating an example of an arrangement of lines and pads, which are included in the touch sensor of FIG. 3. FIG. 4B is a view illustrating another example of the arrangement of the lines and the pads, which are included in the touch sensor of FIG. 3.

The touch sensor according to this exemplary embodiment is identical to the touch sensor according to FIGS. 2A and 2B, except a configuration of additional routing lines connected to second sensor electrodes. Therefore, components identical or corresponding to those of the touch sensor according to FIGS. 2A and 2B are designated by like reference numerals, and their overlapping descriptions will be omitted.

Referring to FIGS. 3, 4A, and 4B, the touch sensor 101 may include first sensor electrodes IE1, second sensor electrodes IE2, a third sensor electrode IE3, a fourth sensor electrode IE4, an opening OP, first routing lines RL1-1, RL1-2, and RL1-3, second routing lines RL2-1, RL2-2, RL2-3, RL2-4, and RL2-5, third routing lines RL3-1 and RL3-2, fourth routing lines RL4-1 and RL4-2, additional routing lines RL2'-1, RL2'-2, RL2'-3, RL2'-4, and RL2'-5, and a first shielding electrode G1. The touch sensor 101 may further include additional shielding electrodes G2, G3, G4, G5, and G6, electrostatic protection lines ES1 and ES2, and the like.

The additional routing lines RL2'-1, RL2'-2, RL2'-3, RL2'-4, and RL2'-5 may be connected to the other ends of the respective second sensor electrodes EL2. The additional routing lines RL2'-1, RL2'-2, RL2'-3, RL2'-4, and RL2'-5 may transfer the substantially same driving signal as the second routing lines RL2-1, RL2-2, RL2-3, RL2-4, and RL2-5. That is, a double routing line structure may be applied to the second sensor electrodes EL2. Thus, a resistance value of the second sensor electrodes EL2 in the second direction DR2 is decreased, and a time constant is decreased. Accordingly, the RC delay of the driving signal can be improved. The number of pads may increase by an arrangement of the additional routing lines RL2'-1, RL2'-2, RL2'-3, RL2'-4, and RL2'-5.

Like the third and fourth sensor electrodes EL3 and EL4, at least one sensor electrode of the second sensor electrodes EL2 corresponding to the opening OP may be separated into a third side part located at a third side of the opening OP and a fourth side part located at a fourth side of the opening OP. The third side may correspond to a direction facing one end of each of the sensor electrodes EL2, and be an upper side of the opening OP referring to FIG. 3. The fourth side may correspond to a direction facing the other end of each of the second sensor electrode EL2, and be a lower side of the opening OP.

In an exemplary embodiment, the third side part and the fourth side part may be electrically separated from each other. The second routing lines RL2-1, RL2-2, RL2-3, RL2-4, and RL2-5 connected to the third side part and the additional routing lines RL2'-1, RL2'-2, RL2'-3, RL2'-4, and RL2'-5 connected to the fourth side part are not connected to each other.

In another exemplary embodiment, the third side part and the fourth side part may be electrically connected to each other through at least one connection pattern disposed detouring the opening OP.

First to fifth shielding electrodes G1, G2, G3, G4, and G5 and electrostatic protection lines ES1 and ES2, which are described with reference to FIG. 2A, may be formed in the peripheral region. The fourth shielding electrode G4 may be disposed between the fourth routing lines RL4-1 and RL4-2 and the additional routing lines RL2'-1, RL2'-2, RL2'-3, RL2'-4, and RL2'-5.

In an exemplary embodiment, a sixth shielding electrode G6 may be disposed between the additional routing lines RL2'-1, RL2'-2, RL2'-3, RL2'-4, and RL2'-5 and a second electrostatic protection line ES2.

Referring to FIGS. 4A and 4B, the routing lines and the shielding electrodes may extend substantially identically to the pad unit PD in the position relationship between the routing lines and the shielding electrodes.

As compared with the pad unit of FIG. 2A, a first pad unit PD1 of FIG. 4A may further include pads disposed between the pad GP4 and the pad EP3 connected to the second electrostatic protection line ES2. The pads may include pads RP2'-1, RP2'-2, RP2'-3, RP2'-4, and RP2'-5 respectively connected to the additional routing lines RL2'-1, RL2'-2, RL2'-3, RL2'-4, and RL2'-5 and a pad connected to the sixth shielding electrode G6.

The first pad unit PD1 may be connected to an FPC for touch driving, which drives the second routing lines RL2-1, RL2-2, RL2-3, RL2-4, and RL2-5, the fourth routing lines RL4-1 and RL4-2, and the additional routing lines RL2'-1, RL2'-2, RL2'-3, RL2'-4, and RL2'-5. A second pad unit PD2 of FIG. 4A may be connected to an FPC for touch driving, which drives the first routing lines RL1-1, RL1-2, and RL1-3 and the third routing lines RL3-1 and RL3-2.

A pad unit PD3 of FIG. 4B may means that all the pads are connected to one FPC for touch driving.

As described above, the touch sensor 101 further includes the additional routing lines RL2'-1, RL2'-2, RL2'-3, RL2'-4, and RL2'-5 connected to the other ends of the respective second sensor electrodes EL2, so that touch sensing sensitivity can be improved.

FIG. 5 is a view illustrating an example of a touch sensor construed according to an exemplary embodiment of the invention.

Referring to FIGS. 3 and 5, first sensor electrodes IE1, second electrodes IE2, an opening OP, and connection patterns CP1 and CP2 may be disposed in a touch active region TA of the touch sensor.

Each of the first sensor electrodes IE1 may include first sensor patterns SP1 extending in the first direction DR1. The first sensor electrodes IE1 may be arranged in the second direction DR2 intersecting the first direction DR1. Some of the first sensor electrodes IE1 may be laterally separated from each other by the opening OP.

Each of the second sensor electrodes IE2 may include second sensor patterns SP2 extending in the second direction DR2. The second sensor electrodes IE2 may be arranged in the first direction DR1 intersecting the second direction DR2. Some of the second sensor electrodes IE2 may be vertically separated from each other by the opening OP.

The opening OP may be formed while vertically penetrating the touch active region TA formed by the first sensor electrodes IE1 and the second sensor electrode IE2.

In a sensor electrode corresponding to the opening OP among the first sensor electrodes IE1, opening sensor patterns OSP1 and OSP1' disposed adjacent to respective sides of the opening OP in the second direction DR2 may have a shape in which a portion of the first sensor pattern SP1 is cut by the opening OP. For example, the opening sensor patterns OSP1 and OSP1' may be respectively formed at left and right sides of the opening OP. Each of the opening sensor patterns OSP1 and OSP1' may be formed to be spaced apart from a sidewall of the opening OP.

The opening sensor patterns OSP1 and OSP1' corresponding to each other, which are included in one first sensor electrode IE1, may be defined as a first opening sensor pattern pair OSP1 and OPS1'. The first opening sensor pattern pair OSP1 and OPS1' may be electrically connected by a first connection pattern CP1. The first connection pattern CP1 may be formed detouring the opening OP. Accordingly, a first sensor electrode IE1 corresponding to the opening OP is continued as one node from one end to the other end thereof.

Similarly, a second opening sensor pattern pair OSP2 and OSP2' included in another first sensor electrode IE1 may be electrically connected by a second connection pattern CP2 formed detouring the opening OP. However, this is merely illustrative, and the shape, size, and number of opening sensor pattern pairs are not limited thereto.

Although a case where each of the opening sensor patterns OSP1, OSP1', OSP2, and OSP2' has a shape in which the first sensor pattern SP1 is cut in a triangular shape is illustrated in FIG. 5, the shape of the opening sensor patterns OSP1, OSP1', OSP2, and OSP2' is not limited thereto. The shape of each of the opening sensor patterns OSP1, OSP1', OSP2, and OSP2' may be modified corresponding to the position and shape of the opening OP.

A first sensor electrode IE1 corresponding to the opening OP may be continued as one electrode from one end to the other end thereof. Therefore, referring to FIG. 5, first routing lines RL1-1 and RL1-2 may be connected to only one ends of the respective first sensor electrodes IE1 to extend to a peripheral region of the touch active region TA.

In an exemplary embodiment, the first and second connection patterns CP1 and CP2 may be disposed detouring an upper or lower side of the opening OP adjacent thereto. For example, referring to FIG. 5, the first connection pattern CP1 may detour the upper side of the opening OP, and the second connection pattern CP2 may detour the lower side of the opening OP.

The first and second connection patterns CP1 and CP2 are not to be conceived by a user. Therefore, the first and second connection patterns CP1 and CP2 may have a width thin enough not to be recognized by the user during a regular operation. Also, the first and second connection patterns CP1 and CP2 may be formed of a low-resistance metal so as to prevent an increase in resistance and an increase in RC delay, caused by the connection patterns. For example, the first and second connection patterns CP1 and CP2 may include molybdenum, silver, titanium, copper, aluminum, and alloys thereof.

In an exemplary embodiment, the second sensor patterns SP2 forming the second sensor electrode IE2 may also include opening sensor patterns having a shape in which a portion of the second sensor patterns SP2 disposed adjacent to the opening sensor patterns cut corresponding to the opening sensor pattern. The opening sensor patterns of the second sensor electrode IE2 may be electrically insulated from each other. In an exemplary embodiment, a double routing structure may be applied to the second sensor electrode IE2. Therefore, second routing lines RL2-1 and RL2-2 may be respectively connected to one ends of the second sensor electrodes IE2, and additional routing lines RL2'-1 and RL2'-2 may be respectively connected to the respective ends of the second sensor electrodes IE2.

As described above, the touch sensor having the opening OP and the display device having the same according to the exemplary embodiment of the invention include the connection pattern CP1 connecting between the opening sensor patterns OSP1 and OSP1'. Thus, touch sensing can be performed on the entire region in which the sensor electrodes IE1 and IE2 are disposed without adding any routing line, and a design space of the peripheral region can be ensured.

FIG. 6 is a sectional view illustrating an example of a section taken along a sectional line A-A' of the touch sensor of FIG. 5.

Referring to FIGS. 5 and 6, the touch sensor TS may include a first conductive layer 22 constituting the connection pattern CP1 in the touch active region TA, a second conductive layer 26 constituting the first sensor electrodes IE1 and the second sensor electrodes IE2 in the touch active region TA, and a plurality of insulating layers 24 and 28.

In an exemplary embodiment, the touch sensor TS may be directly disposed on a display panel DP.

The display panel DP may include a base layer 10, an encapsulation layer 16, and a circuit element layer 12 and a display element layer 14, which are disposed between the base layer 10 and the encapsulation layer 16. The circuit element layer 12, the display element layer 14, and the encapsulation layer 16 are not formed in the opening OP. In an exemplary embodiment, the circuit element layer 12 and the display element layer 14 may be disposed to be spaced apart from a sidewall SW of the opening OP at a predetermined distance.

The base layer 10 may include a synthetic resin film. The base layer 10 may also include a glass substrate, a metal substrate, an organic/inorganic complex material substrate, etc.

The circuit element layer 12 may include a transistor structure for light emission of the display element layer 14. The display element layer 14 may include a light emitting layer such as an organic emitting layer and a plurality of electrode layers for supplying a voltage or current to the emitting layer.

In an exemplary embodiment, the encapsulation layer 16 may have a form in which an organic layer and an inorganic layer are alternately deposited multiple times. The encapsulation layer 16 may have flexibility. In an exemplary embodiment, the encapsulation layer 16 may be an encapsulation substrate provided in the form of a glass substrate.

The touch sensor TS may be disposed on the encapsulation layer 16. The touch sensor TS may be directly disposed on the encapsulation layer 16, or be adhered to the encapsulation layer 16 with an adhesive member interposed therebetween.

The touch sensor TS may include the first conductive layer 22, a first insulating layer 24, the second conductive layer 26, and a second insulating layer 28. The first conductive layer 22 and the second conductive layer 26 may have a single-layered structure and a multi-layered structure.

The first conductive layer 22 and the second conductive layer 26 may include a plurality of patterns.

In an exemplary embodiment, the first conductive layer 22 may be disposed on the encapsulation layer 16, and include the connection pattern CP1. The first conductive layer 22 may include a low-resistance metal, and be an opaque electrode. For example, the first conductive layer 22 may include molybdenum, silver, titanium, copper, aluminum, and alloys thereof. The first conductive layer 22 including the connection pattern CP1 may be disposed or patterned to be spaced apart from the sidewall SW of the opening OP. The connection pattern CP1 may be disposed detouring the opening OP.

In an exemplary embodiment, the first conductive layer 22 may include a connection part having a bridge shape, which connects the second sensor patterns SP2.

The first insulating layer 24 covering the first conductive layer 22 may be disposed on the encapsulation layer 16. The first insulating layer 24 may include an inorganic material, an organic material, and a composite material.

The second conductive layer 26 may be disposed on the first insulating layer 24. The second conductive layer 26 may form the first and second sensor patterns SP1 and SP2 including the opening sensor patterns OSP1 and OSP1' and the first and second sensor electrodes IE1 and IE2. The second conductive layer 26 may include a transparent conductive material. For example, the second conductive layer 26 may include a transparent conductive oxide such as indium tin oxide (ITO), indium zinc oxide (IZO), zinc oxide (ZnO), or indium tin zinc oxide (ITZO). In addition, the transparent conductive layer may include conductive polymer such as PEDOT, metal nano wire, graphene, etc. In an exemplary embodiment, each of the sensor patterns SP1, SP2, OSP1, and OSP1' formed by the second conductive layer 26 may have a mesh shape so as to prevent the sensor pattern from being viewed by a user. The second conductive layer 26 may be disposed or patterned to be spaced apart from the sidewall SW of the opening OP.

In an exemplary embodiment, the second conductive layer 26 may be connected to the first conductive layer 22 through a contact hole CNT penetrating the first insulating layer 24. For example, the connection pattern CP1 may be connected to each of the opening sensor patterns OSP1 and OSP2 through the contact hole CNT.

The second insulating layer 28 covering the second conductive layer 26 may be disposed on the first insulating layer 24. The second insulating layer 28 may include an inorganic material, an organic material, and a composite material.

In an exemplary embodiment, functional layers such as an anti-reflection layer, an anti-fingerprint layer, a hard coating layer, and a protective film may further disposed on the touch sensor TS.

FIG. 7 is a sectional view illustrating another example of the section taken along the sectional line A-A' of the touch sensor of FIG. 5.

A stack structure of FIG. 7 is substantially identical to the structure of the touch sensor of FIG. 6, except positions of the connection pattern CP1 and the sensor electrode including the opening sensor patterns OSP1 and OSP1'. Therefore, components identical or corresponding to those of the touch sensor of FIG. 6 are designated by like reference numerals, and their overlapping descriptions will be omitted.

Referring to FIG. 7, the touch sensor TS may include a first conductive layer 23 constituting the first sensor electrodes IE1 and the second sensor electrodes IE2 in the touch active region TA, a second conductive layer 27 constituting the connection pattern CP1 in the touch active region TA, and a plurality of insulating layers 24 and 28.

The first conductive layer 23 may form the sensor patterns SP1 and SP2 including the opening sensor patterns OSP1 and OSP1'. The first conductive layer 23 may include a transparent conductive material. The first conductive layer 23 may be formed or patterned to be spaced apart from the sidewall SW of the opening OP.

A first insulating layer 24 covering the first conductive layer 23 may be disposed on the encapsulation layer 16. The first insulating layer 24 may include may include an inorganic material, an organic material, and a composite material.

The second conductive layer 27 may be disposed on the first insulating layer 24. The second conductive layer 27 may include the connection pattern CP1. The second conductive layer 27 may include a low-resistance metal, and be an opaque electrode. The second conductive layer 27 may be formed or patterned to be spaced apart from the sidewall SW of the opening OP.

In an exemplary embodiment, the second conductive layer 27 may be connected to the first conductive layer 23 through a contact hole CNT penetrating the first insulating layer 24. For example, the connection pattern CP1 may be connected to each of the opening sensor patterns OSP1 and OSP2 through the contact hole CNT.

A second insulating layer 28 covering the second conductive layer 27 may be disposed on the first insulating layer 24. The second insulating layer 28 include may include an inorganic material, an organic material, and a composite material.

FIG. 8 is a view illustrating an example of an intersection region EE between two lines of intersecting sensor patterns included in the touch sensor of FIG. 5.

Referring to FIG. 8, the touch sensor TS may include first sensor patterns SP1, second sensor patterns SP2, a connection part C1, and a plurality of bridges C2-1 and C2-2 in one intersection region EE.

The first sensor patterns SP1 and the connection part C1 may be connected to each other on one plane or the same layer.

The second sensor patterns SP2 may be disposed to be spaced apart from each other. The second sensor patterns SP2 may be connected to each other by the bridges C2-1 and C2-2. The bridges C2-1 and C2-2 may connect the second sensor patterns SP2 adjacent to each other in a bridge shape through a contact hole CNT-1. In an exemplary embodiment, the bridges C2-1 and C2-2 may be formed of the same material through the same process as the connection patterns CP1 and CP2, and be disposed on the same layer.

In an exemplary embodiment, the first and second sensor patterns SP1 and SP2 may include a transparent conductive material.

The touch sensor TS may sense a touch by detecting a change in capacitance between the first sensor pattern SP1 and the second sensor pattern SP2.

In an exemplary embodiment, the touch sensor TS may further include dummy electrodes DM disposed between the sensor patterns SP1 and SP2 to be spaced apart from each other. The dummy electrode DM is formed through the same process as the first sensor pattern SP1 and the second sensor pattern SP2. Therefore, the dummy electrode DM may include the same material and have the same stack structure. The dummy electrode DM is a floating electrode, and is not electrically connected to the first sensor electrode SP1 and the second sensor pattern SP2. The dummy electrode DM is disposed, so that a boundary region between the first sensor pattern SP1 and the second sensor pattern SP2 would not be easily recognizable. Further, a fringe effect between the first sensor pattern SP1 and the second sensor pattern SP2 can be controlled by adjusting the width and thickness of the dummy electrode DM, and the capacitance between the first sensor pattern SP1 and the second sensor pattern SP2 can be optimized.

FIGS. 9, 10, 11, and 12 are views illustrating examples of the touch sensor of FIG. 5.

Touch sensors of FIGS. 9, 10, 11, and 12 are substantially identical or similar to the touch sensor of FIG. 5, except structures of the connection pattern and/or arrangements of the routing lines. Therefore, components identical or corresponding to those of the touch sensor of FIG. 5 are designated by like reference numerals, and their overlapping descriptions will be omitted.

Referring to FIGS. 9, 10, 11, and 12, first sensor electrodes IE1, second sensor electrodes IE2, an opening OP, and connection patterns CP1 and CP2 may be disposed in a touch active region TA of each of the touch sensors.

A first opening sensor pattern pair OSP1 and OSP1' disposed adjacent to the opening OP may be electrically connected by a first connection pattern CP1, and a second opening sensor pattern pair OSP2 and OSP2' may be electrically connected by a second connection pattern CP2.

First routing lines RL1-1 and RL1-2 may be respectively connected to one ends of first sensor electrodes IE1 corresponding to the opening OP. In an exemplary embodiment, referring to FIG. 9, additional routing lines RL1'-1 and RL1'-2 may be respectively connected to the other ends of the first sensor electrodes IE1. The additional routing lines RL1'-1 and RL1'-2 may be substantially identical to the fourth routing lines RL4-1 and RL4-2 of FIG. 3. That is, a doubling routing structure may be applied to the first sensor electrodes IE1 corresponding to the opening OP. The additional routing lines RL1'-1 and RL1'-2 along with the first routing lines RL1-1 and RL1-2 may transfer a sensing signal to the touch driver.

Thus, an RC delay can be reduced due to the addition of the additional routing lines RL1'-1 and RL1'-2, and a signal transfer timing variation for each touch point between the left and right sides of the opening OP can be decreased. Accordingly, the sensing accuracy and uniformity in the entire touch active region TA can be improved.

Figure 10:
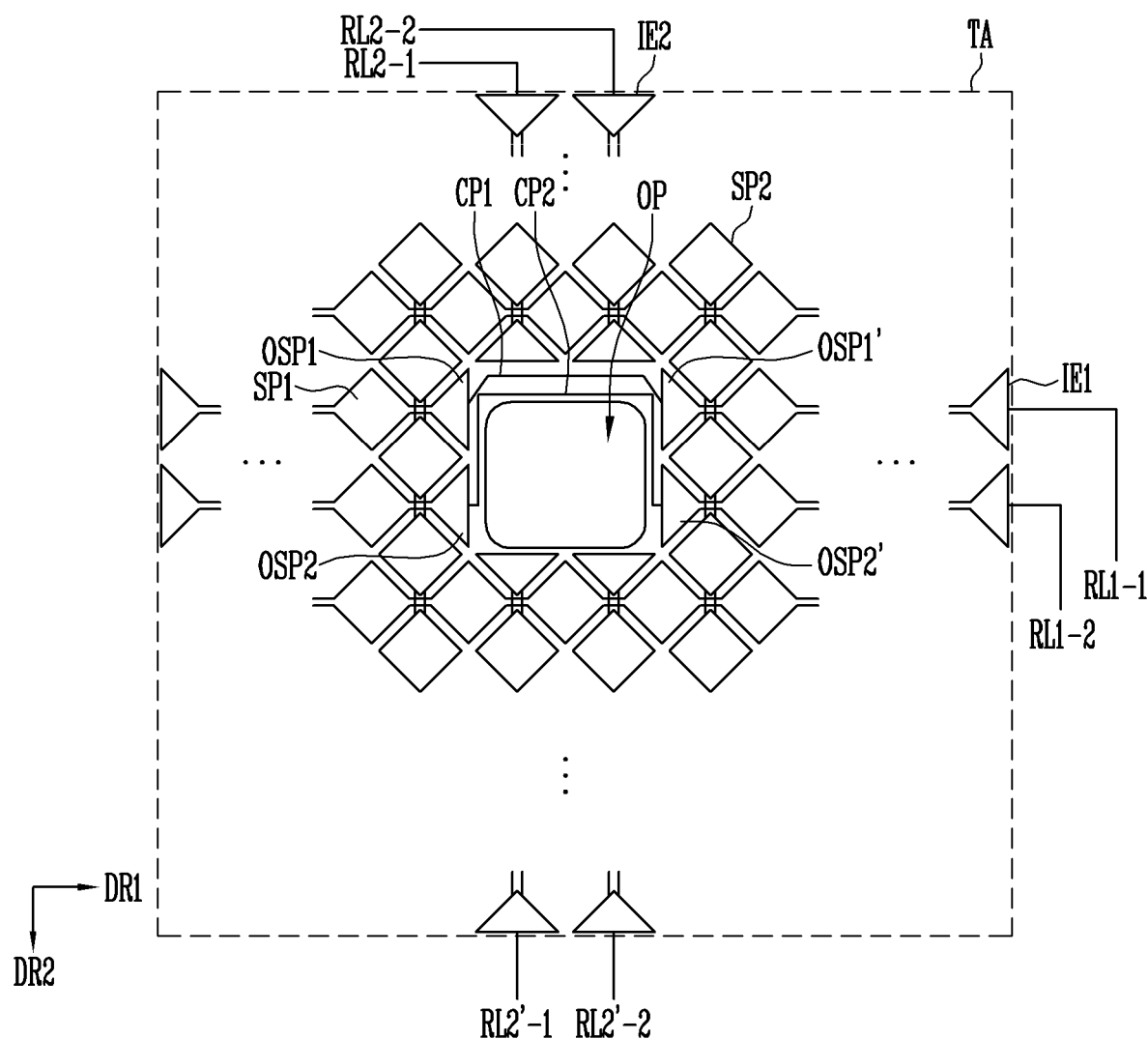

In an exemplary embodiment, referring to FIG. 10, the touch sensor may include a plurality of first sensor electrodes EL corresponding to the opening OP. The first and second connection patterns CP1 and CP2 connecting the respective opening sensor pattern pairs OSP1, OSP1', OSP2, and OSP2' may be disposed detouring the opening OP to the same one side of the opening OP. The first connection pattern CP1 and the second connection pattern CP2 may be electrically isolated from each other. That is, the first and second connection patterns CP1 and CP2 disclosed in FIG. 10 may be designed without any short circuit with other conductive patterns according to the position of the opening OP.

Figure 11:
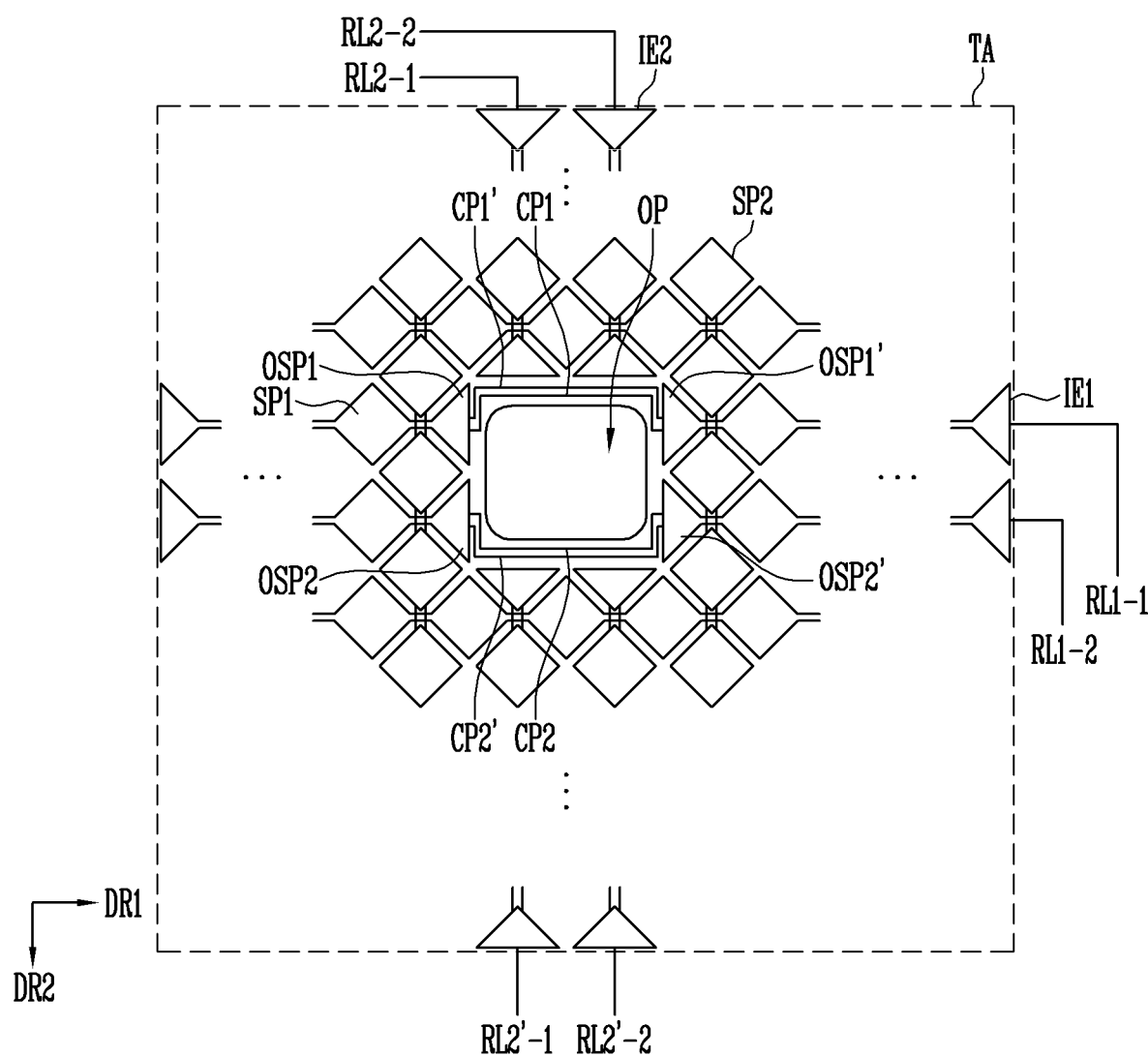

In an exemplary embodiment, referring to FIG. 11, the first opening sensor pattern pair OSP1 and OSP1' may be connected through a plurality of first connection patterns CP1 and CP1'. Similarly, the second opening sensor pattern pair OSP2 and OSP2' may be connected through a plurality of second connection patterns CP2 and CP2'. That is, a plurality of connection patterns are connected to the respective opening sensor pattern pairs, so that the total resistance and RC delay can be decreased.

Figure 12:
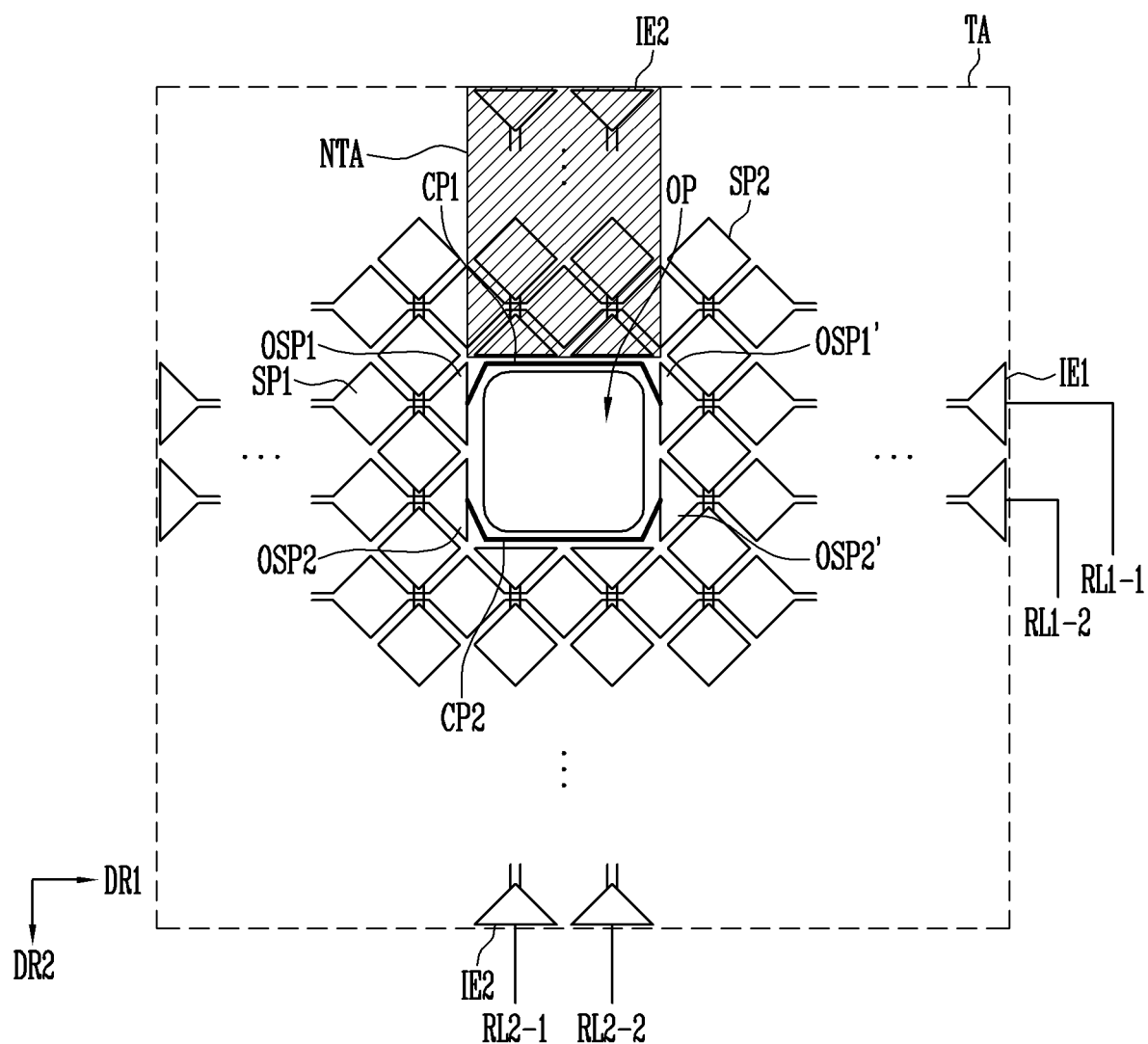

Referring to FIG. 12, an exemplary embodiment illustrates that a routing line may not be connected to one end of each of second sensor electrodes IE2 corresponding to the upper side of the opening OP. That is, the second sensor electrode IE2 corresponding to the upper side of the opening OP may be floated, and a region corresponding to the upper side of the opening OP may be a touch non-active region NTA. Touch sensing is not performed in the touch non-active region NTA. This exemplary embodiment may be applied when the touch non-active region NTA at the upper side of the opening OP is not large. The second sensor patterns SP2 may not be patterned (disposed) in the touch non-active region NTA at the upper side of the opening OP. Accordingly, material consumption for patterning the routing lines and the sensor patterns can be reduced.

FIGS. 13A and 13B are views illustrating examples of a touch sensor construed according to another exemplary embodiment of the invention.

Touch sensors of FIGS. 13A and 13B are substantially identical or similar to the touch sensor of FIG. 5, except arrangements of the connection patterns. Therefore, components identical or corresponding to those of the touch sensor of FIG. 5 are designated by like reference numerals, and their overlapping descriptions will be omitted.

Referring to FIGS. 13A and 13B, a third opening sensor pattern pair OSP3 and OSP3' disposed adjacent to an opening OP may be electrically connected by a third connection pattern CP3, and a fourth opening sensor pattern pair OSP4 and OSP4' disposed adjacent to the opening OP may be electrically connected by a fourth connection pattern CP4.

The opening sensor patterns OSP3 and OSP3' corresponding to each other, which are included in one second sensor electrode IE2, may be defined as a third opening sensor pattern pair OSP3 and OSP3'.

For example, the third opening sensor pattern pair OSP3 and OSP3' and a fourth opening sensor pattern pair OSP4 and OSP4' may be respectively some of second sensor patterns SP2 included in the second sensor electrodes IE2. Also, the third opening sensor pattern pair OSP3 and OSP3' and a fourth opening sensor pattern pair OSP4 and OSP4' may correspond to upper and lower sides of the opening OP, respectively.

Although a case where each of the opening sensor patterns OSP3, OSP3', OSP4, and OSP4' has a shape in which the second sensor pattern SP2 is cut in a triangular shape is illustrated in FIGS. 13A and 13B, the shape of the opening sensor patterns OSP3, OSP3', OSP4, and OSP4' is not limited thereto. The shape of each of the opening sensor patterns OSP3, OSP3', OSP4, and OSP4' may be modified corresponding to the position and shape of the opening OP.

In an exemplary embodiment, the third opening sensor pattern pair OSP3 and OSP3' may be connected by the third connection pattern CP3, and the fourth opening sensor pattern pair OSP4 and OSP4' may be connected by the fourth connection pattern CP4. The third connection pattern CP3 and the fourth connection pattern CP4 may be formed of a low-resistance metal.

The third opening sensor pattern pair OSP3 and OSP3', the fourth opening sensor pattern pair OSP4 and OSP4', the third connection pattern CP3, and the fourth connection pattern CP4 may be formed in the same manner as that described with reference to FIGS. 6 and 7.

The second sensor electrode IE2 may be connected in a double routing structure to the touch driver.

In an exemplary embodiment, opening sensor pattern pairs respectively included in first sensor electrodes IE1 corresponding to the opening OP may be electrically insulated from each other. Routing lines RL1-1, RL1-2, RL1'-1, and RL1'-2 may be connected to both ends of the respective first electrodes IE1 corresponding to the opening OP so as to perform touch sensing operation at the left and right sides of the opening OP.

In an exemplary embodiment, referring to FIG. 13B, a third opening sensor pattern pair OSP3 and OSP3' may be connected through a plurality of third connection patterns CP3. Similarly, a fourth opening sensor pattern pair OSP4 and OSP4' may be connected through a plurality of fourth connection patterns CP4. That is, a plurality of connection patterns are connected to the opening sensor pattern pairs, so that the total resistance and RC delay can be decreased.

FIG. 14 is a view illustrating an example of a touch sensor construed according to yet another exemplary embodiment of the invention. FIG. 15 is a sectional view illustrating an example of a section taken along a sectional line B-B' of the touch sensor of FIG. 14.

Referring to FIGS. 14 and 15, a first opening sensor pattern pair OSP1 and OSP1' disposed adjacent to an opening OP at the left and right sides of the opening OP may be electrically connected by a first connection pattern CP1, and a second opening sensor pattern pair OSP2 and OSP2' disposed adjacent to the opening OP at the left and right sides of the opening OP may be electrically connected by a second connection pattern CP2. In addition, a third opening sensor pattern pair OSP3 and OSP3' disposed adjacent to the opening OP at the upper and lower sides of the opening OP may be electrically connected by a third connection pattern CP3, and a fourth opening sensor pattern pair OSP4 and OSP4' disposed adjacent to the opening OP at the upper and lower sides of the opening OP may be electrically connected by a fourth connection pattern CP4.

Each of the first to fourth connection patterns CP1, CP2, CP3, and CP4 may be formed detouring the opening OP. The first to fourth connection patterns CP1, CP2, CP3, and CP4 are not in contact with each other. For example, the first and second connection patterns CP1 and CP2 and the third and fourth connection pattern CP3 and CP4 may be formed in different layers.

Referring to FIG. 15, a first conductive layer 22, a second conductive layer 26, and a third conductive layer 29 may be sequentially stacked on an encapsulation layer 16 of a display panel DP.

The first conductive layer 22 may include the first and second connection patterns CP1 and CP2. The first conductive layer 22 may include a low-resistance metal. The first conductive layer 22 may be formed or patterned to be spaced apart from a sidewall SW of the opening OP.

A first insulating layer 24 covering the first conductive layer 22 may be disposed on the encapsulation layer 16.

The second conductive layer 26 may be disposed on the first insulating layer 24. The second conductive layer 26 may include sensor patterns SP1 and SP2 including the opening sensor patterns OSP1, OSP1', OSP2, OSP2', OSP3, OSP3', OSP4, and OSP4'. The second conductive layer 26 may include a transparent conductive material. The second conductive layer 26 may be formed or patterned to be spaced apart from the sidewall SW of the opening OP.

In an exemplary embodiment, the second conductive layer 26 may be connected to the first conductive layer 22 through a contact hole penetrating the first insulating layer 24. For example, the first connection pattern CP1 may be connected to each of the first opening sensor pattern pair OSP1 and OSP1' through the contact hole.

A second insulating layer 28 covering the second conductive layer 26 may be disposed on the first insulating layer 24.

A third conductive layer 29 may be disposed on the second insulating 28. The third conductive layer 29 may include the third and fourth connection patterns CP3 and CP4. The third conductive layer 29 may include a low-resistance metal. The third conductive layer 29 may be formed or patterned to be spaced apart from the sidewall SW of the opening OP.

In an exemplary embodiment, the third conductive layer 29 may be connected to the second conductive layer 26 through a contact hole penetrating the second insulating layer 28. For example, the third connection pattern CP3 may be connected to each of the third opening sensor pattern pair OSP3 and OSP3' through the contact hole.

Accordingly, sensor patterns at the left and right sides of the opening OP are electrically connected, and sensor patterns at the upper and lower sides of the opening OP are electrically connected.

FIG. 16 is a view illustrating an example of an opening and sensor patterns around the opening, which are included in a touch sensor constructed according to an exemplary embodiment of the invention.

Referring to FIGS. 8 and 16, according to an exemplary embodiment, the opening OP may have an area smaller than that of one intersection region EE.

In the exemplary embodiment, opening sensor patterns OSP3 and OSP3' adjacent to the opening OP among second sensor patterns SP2 may be connected to each other by bridges C2-1 and C2-2. The bridges C2-1 and C2-2 connected to the opening sensor patterns OSP3 and OSP3' may be formed detouring the opening OP. Therefore, the bridges C2-1 and C2-2 connected to the opening sensor patterns OSP3 and OSP3' may be formed in a shape different from that of bridges BR connected to other sensor patterns.

FIG. 17 is a view illustrating another example of the opening and the sensor patterns around the opening, which are included in the touch sensor constructed according to an exemplary embodiment of the invention.

Referring to FIG. 17, a plurality of openings OP1 and OP2 may be formed in a touch active region of the touch sensor.

In an exemplary embodiment, a first opening OP1 and a second opening OP2 may be formed to be spaced apart from each other at a predetermined distance, corresponding to one first sensor electrode. A first sensor electrode IE1 may have opening sensor patterns OSP11, OSP12, OSP13, and OSP14 formed by the first and second openings OP1 and OP2.

An opening sensor pattern pair OSP11 and OSP12 corresponding to the first opening OP1 may be connected to each other by a first connection pattern CP11. In addition, an opening sensor pattern pair OSP13 and OSP14 corresponding to the second opening OP2 may be connected to each other by a second connection pattern CP12. The opening sensor pattern pairs OSP11, OSP12, OSP13, and OSP14 and the connection patterns CP11 and CP12 may be formed in different layers, and be connected through a contact hole.

FIG. 18 is a view illustrating another example of the opening and the sensor patterns around the opening, which are included in the touch sensor constructed according to an exemplary embodiment of the invention.

Referring to FIG. 18, an opening OP may be disposed avoiding the first sensor patterns SP1. In an exemplary embodiment, the size of the opening OP may be smaller than that of one intersection region EE. The opening OP has no influence on the arrangement and design of the first sensor patterns SP1.

Parts SP2' ad SP2" corresponding to the opening OP among second sensor patterns SP2 corresponding to the opening OP may be insulated from each other at both sides of the opening OP. The parts SP2' ad SP2" corresponding to the opening OP among the second sensor patterns SP2 may be connected to different routing lines, to perform touch sensing.

In an exemplary embodiment, referring to FIG. 16, the parts SP2' ad SP2" corresponding to the opening OP among the second sensor patterns SP2 may be electrically connected to each other through a bridge pattern detouring the opening OP.

FIG. 19 is a view illustrating still another example of the opening and the sensor patterns around the opening, which are included in the touch sensor constructed according to an exemplary embodiment of the invention.

Referring to FIG. 19, an opening OP may have an area smaller than that of one intersection region EE.

Opening sensor patterns OSP1 and OSP1' adjacent to the opening OP among first sensor patterns SP1 may be connected to each other by one connection pattern CP. The connection pattern CP may be formed to detour the opening OP. Although a case where two connection patterns CP are disposed at upper and lower sides of the opening OP is illustrated in FIG. 19, the arrangement, number, and shape of connection patterns CP are not limited thereto. For example, the connection pattern CP may be formed at only one of the upper and lower sides of the opening OP.

In an exemplary embodiment, the connection pattern CP may be formed in the same layer as the first sensor pattern SP1. Also, the connection pattern CP may include the same material as the first sensor pattern SP1. For example, the connection pattern CP and the first sensor pattern SP1 may include a transparent electrode material such as ITO.

The connection pattern CP may be formed not to be in contact with an adjacent second sensor pattern SP2. Also, the connection pattern CP may be formed not to be in contact with other first sensor patterns SP1 that do not correspond to the opening OP.

In an exemplary embodiment, opening sensor patterns OSP3 and OSP3' adjacent to the opening OP among the second sensor patterns SP2 may be connected to each other by bridges C2-1 and C2-2. The bridges C2-1 and C2-2 connected to the opening sensor patterns OSP3 and OSP3' may be formed to detour the opening OP. The bridges C2-1 and C2-2 may be disposed in a layer different from that of the first and second sensor patterns SP1 and SP2. Therefore, the bridges C2-1 and C2-2 are disposed in a layer different from that of the connection pattern, and are not in contact with each other.

FIG. 20 is a view illustrating an example of a touch sensor according to another exemplary embodiment of the invention.

Referring to FIG. 20, a touch active region TA of the touch sensor may include a trench TR or a notch.

In the touch active region TA, first electrodes IE1-1 to IE1-$j$ may be arranged along a second direction DR2, and second electrodes IE2-1 to IE2-$k$ may be arranged along a first direction DR1.

Like the opening OP, some sensor patterns of the first electrode IE1-1 may be removed by the trench TR. Portions of the first electrode IE1-1 of which connection is cut by the trench TR may be electrically connected by a connection pattern CP1.

However, this is merely illustrative, and the shape and position of the trench TR are not limited thereto. The touch active region TA may have various shapes depending on electronic devices applied thereto.

As described above, according to the structure of the touch sensor according to the exemplary embodiments of the invention, display devices and electronic devices having various touch active regions TA can be implemented. Further, the sensing sensitivity and uniformity of the entire touch active region TA can be improved.

The touch sensor and the display device according to the exemplary embodiments of the invention include the routing lines (i.e., the third and fourth routing lines) respectively disposed at both ends of the sensor electrodes (i.e., the third and fourth sensor electrodes) separated corresponding to the opening, so that an increase in the number of lines in the peripheral region can be minimized, and sensing sensitivity and sensing uniformity in the touch active region can be improved. In addition, the first shielding electrode is additionally inserted between the second routing lines and the additionally disposed fourth routing lines, so that electrical influence between lines in the peripheral region can be reduced. Thus, touch sensing accuracy can be improved.

Further, the touch sensor and the display device according to the exemplary embodiments of the invention include the connection pattern connecting between the opening sensor patterns. Thus, touch sensing can be performed on the entire region in which the sensor electrodes are disposed without adding any routing line, and a design space of the peripheral region can be sufficiently ensured.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A touch sensor having a touch active region and a peripheral region surrounding at least a portion of the touch active region, the touch sensor comprising:
   first sensor electrodes extending in a first direction and arranged in a second direction intersecting the first direction;
   second sensor electrodes extending in the second direction and arranged in the first direction;
   an opening in the touch active region spaced from the first sensor electrodes and the second sensor electrodes;
   a third sensor electrode extending in the first direction and disposed adjacent to a first side of the opening;
   a fourth sensor electrode extending in the first direction and disposed adjacent to a second side of the opening;
   first lines respectively connected to portions of the first sensor electrodes, the first lines disposed in a first peripheral area of the peripheral region;
   second lines respectively connected to portions of the second sensor electrodes, the second lines disposed in a second peripheral area of the peripheral region;
   a third line connected to a portion of the third sensor electrode, the third line disposed in the first peripheral area;
   a fourth line connected to a portion of the fourth sensor electrode, the fourth line disposed in the second peripheral area;
   a first shielding electrode disposed in the second peripheral region, the first shielding electrode extending between the second lines and the fourth line;
   a first electrostatic protection line disposed in the peripheral region in a first open loop shape surrounding the first, second, third and fourth line along a circumference periphery of the touch active region, and
   a second electrostatic protection line disposed in the peripheral region in a second open loop shape smaller than the first open loop shape,
   wherein the third sensor electrode and the fourth sensor electrode are electrically insulated from each other and spaced apart from a wall of the opening.

2. The touch sensor of claim 1, wherein the portions of the first and second sensor electrodes to which the first and second lines are respectively connected comprise distal ends of the first and second sensor electrodes, respectively.

3. The touch sensor of claim 1, wherein at least one of the first lines, the second lines, the third lines and the fourth line comprise routing lines.

4. The touch sensor of claim 1, wherein the second side is generally opposite to the first side.

5. The touch sensor of claim 1, wherein the first lines and the third line extend adjacent to each other.

6. The touch sensor of claim 5, further comprising:
   a second shielding electrode disposed in the peripheral region extending between the first lines and the touch active region; and
   a third shielding electrode disposed in the peripheral region outside of the first lines and the third lines.

7. The touch sensor of claim 6, further comprising:
   a fourth shielding electrode extending between the fourth line and the touch active region; and
   a fifth shielding electrode disposed outside of the second lines.

8. The touch sensor of claim 1, further comprising:
   additional lines respectively connected to other portions of the second sensor electrodes, the additional lines transferring substantially the same driving signal as the second lines.

9. The touch sensor of claim 8, further comprising:
   additional shielding electrodes respectively disposed between the additional lines and the first lines and between the additional lines and the fourth line.

10. The touch sensor of claim 8, wherein at least one sensor electrode of the second sensor electrodes is electrically separated into a third part and a fourth parts by the opening,
    wherein the third part is disposed adjacent to a third side of the opening, and
    wherein the fourth part is disposed at adjacent to a fourth side of the opening, the fourth side being generally opposite to the third side.

11. The touch sensor of claim 10, wherein the third part is not connected to the second lines.

12. The touch sensor of claim 10, wherein the third part and the fourth part are electrically connected through at least one connector disposed around but not into the opening.

13. The touch sensor of claim 12, wherein the connector and the second sensor electrodes are formed in different layers with an insulating layer interposed therebetween,
    wherein the connector is connected to the third and fourth parts via a contact hole formed through the insulating layer, and
    wherein the connector comprises a low-resistance metal.

14. The touch sensor of claim 1, wherein the third sensor electrode and the fourth sensor electrode are electrically connected to each other through at least one connector disposed around but not into the opening.

15. The touch sensor of claim 14, wherein the connector comprises a connection pattern spaced apart from the opening.

16. The touch sensor of claim 14, wherein the connector comprises a connection pattern is formed in a layer different from that of the third and fourth sensor electrodes with an insulating layer interposed therebetween,
  wherein the connection pattern is connected to the third and fourth sensor electrodes via a contact hole in the insulating layer, and
  wherein the connection pattern comprises a low-resistance metal.

17. A display device comprising:
  a display panel including an opening at a portion of a display region; and
  a touch sensor including a touch active region corresponding to the opening and the display region and a peripheral region surrounding at least a portion of the touch active region, the touch sensor being disposed on the display panel,
  wherein the touch sensor comprises:
  first sensor electrodes extending in a first direction and arranged in a second direction;
  second sensor electrodes extending in the second direction and arranged in the first direction;
  first routing lines respectively connected to first portions of the first sensor electrodes, the first routing lines extending to a first peripheral area of the peripheral region adjacent to a first side of the touch active region;
  second routing lines respectively connected to second portions of the second sensor electrodes, the second routing lines extending to a second peripheral area of the peripheral region adjacent to a second side of the touch active region, the second side being a side opposite to the first side with respect to the touch active region;
  additional routing lines respectively connected to other portions of the first sensor electrodes that are separated by the opening, the additional routing lines extending to the second peripheral area;
  a shielding electrode extending to the second peripheral area, the shielding electrode being disposed between the second routing lines and the additional routing lines;
  a first electrostatic protection line disposed in the peripheral region in a first open loop shape surrounding the first, second, and additional routing lines along a circumference periphery of the touch active region, and
  a second electrostatic protection line disposed in the peripheral region in a second open loop shape smaller than the first open loop shape.

18. The touch sensor of claim 17, wherein the portions of the first and second sensor electrodes to which the first and second routing lines are respectively connected comprise distal ends of the first and second sensor electrodes, respectively.

* * * * *